(12) United States Patent
Su et al.

(10) Patent No.: US 9,403,347 B2
(45) Date of Patent: Aug. 2, 2016

(54) PEELABLE CLOSURE FOR CONTAINER

(75) Inventors: Jau-Ming Su, Kent, WA (US); Charisa Sofian, Seattle, WA (US); Paul Wolak, Indianapolis, IN (US)

(73) Assignee: Berry Plastics Corporation, Evansville, IN (US)

( * ) Notice: Subject to any disclaimer, the term of this patent is extended or adjusted under 35 U.S.C. 154(b) by 851 days.

(21) Appl. No.: 13/327,211

(22) Filed: Dec. 15, 2011

(65) Prior Publication Data

US 2013/0153577 A1    Jun. 20, 2013

(51) Int. Cl.
| B32B 27/32 | (2006.01) |
| B32B 27/08 | (2006.01) |
| B32B 7/12  | (2006.01) |
| B32B 27/36 | (2006.01) |
| B65D 51/16 | (2006.01) |

(52) U.S. Cl.
CPC . *B32B 27/08* (2013.01); *B32B 7/12* (2013.01); *B32B 27/32* (2013.01); *B32B 27/36* (2013.01); *B32B 2250/02* (2013.01); *B32B 2307/306* (2013.01); *B32B 2307/31* (2013.01); *B32B 2439/00* (2013.01); *Y10T 428/2817* (2015.01); *Y10T 428/2848* (2015.01); *Y10T 428/2878* (2015.01)

(58) Field of Classification Search
CPC ..... C08L 23/06; C08L 23/0815; B32B 27/32; B32B 27/08; B32B 2439/70; B32B 27/18; B32B 2250/02; B32B 2307/306; B32B 2307/31; B32B 2439/00; B32B 27/36; B32B 7/12; Y10T 428/2817; Y10T 428/2848; Y10T 428/2878

USPC ................. 428/35.7, 355 EN, 347, 354, 41.7; 220/367.1

See application file for complete search history.

(56) References Cited

U.S. PATENT DOCUMENTS

| 3,645,822 A | 2/1972 | Widiger et al. |
| 4,327,136 A | 4/1982 | Thompson et al. |
| 4,343,852 A | 8/1982 | Isaka et al. |
| 4,401,256 A | 8/1983 | Krieg |
| 4,596,713 A | 6/1986 | Burdette |
| 4,705,707 A | 11/1987 | Winter |
| 4,836,438 A | 6/1989 | Rigby |
| 4,939,009 A | 7/1990 | Beavers et al. |
| 5,021,293 A | 6/1991 | Huang et al. |

(Continued)

FOREIGN PATENT DOCUMENTS

| CA | 1284707 | 6/1991 |
| CA | 1336158 | 7/1995 |

(Continued)

OTHER PUBLICATIONS

International Search Report dated May 23, 2013, relating to International Application No. PCT/US2012/068666.

(Continued)

*Primary Examiner* — Yan Lan
(74) *Attorney, Agent, or Firm* — Barnes & Thornburg LLP

(57) ABSTRACT

A steam-ventable package includes a container formed to include an interior region and a mouth opening into the interior region and a closure coupled to the container to close the mouth. The closure is made from a peelable film coupled to a brim included in the container and configured to be removed from the brim in response to application of shear force applied to the peelable film.

24 Claims, 19 Drawing Sheets

(56) References Cited

U.S. PATENT DOCUMENTS

| | | |
|---|---|---|
| 5,023,134 A | 6/1991 | Bezigian et al. |
| 5,030,505 A | 7/1991 | Dickinson |
| 5,045,330 A | 9/1991 | Pawlowski |
| 5,049,714 A | 9/1991 | Beresniewicz et al. |
| 5,298,302 A | 3/1994 | Boice |
| 5,298,708 A | 3/1994 | Babu et al. |
| 5,314,749 A | 5/1994 | Shah |
| 5,464,969 A | 11/1995 | Miller |
| 5,556,920 A | 9/1996 | Tanaka et al. |
| 5,560,948 A | 10/1996 | Peiffer et al. |
| 5,576,038 A | 11/1996 | Moore et al. |
| 5,849,380 A | 12/1998 | Kashiba et al. |
| 6,006,960 A | 12/1999 | Gross |
| 6,017,986 A | 1/2000 | Burton |
| 6,054,153 A | 4/2000 | Carr et al. |
| 6,054,218 A | 4/2000 | Nucci et al. |
| 6,054,698 A | 4/2000 | Mast |
| 6,066,375 A | 5/2000 | Shanton |
| 6,089,419 A | 7/2000 | Gross |
| 6,146,726 A | 11/2000 | Yoshi et al. |
| 6,186,374 B1 | 2/2001 | Gross |
| 6,211,501 B1 | 4/2001 | McCarthy et al. |
| 6,280,833 B1 | 8/2001 | Peiffer et al. |
| 6,361,728 B1 | 3/2002 | Nucci et al. |
| 6,371,643 B2 | 4/2002 | Saad et al. |
| 6,379,497 B1 | 4/2002 | Sandstrom et al. |
| 6,489,016 B2 | 12/2002 | Kishine |
| 6,500,559 B2 | 12/2002 | Hofmeister et al. |
| 6,592,975 B1 | 7/2003 | Ueyama et al. |
| 6,596,355 B1 | 7/2003 | Mita et al. |
| 6,607,764 B1 | 8/2003 | Keller |
| 6,660,983 B2 | 12/2003 | Monforton et al. |
| 6,670,592 B2 | 12/2003 | McCarthy et al. |
| 6,683,289 B2 | 1/2004 | Whitmore et al. |
| 6,710,315 B2 | 3/2004 | Chisholm |
| 6,744,028 B2 | 6/2004 | Chisholm et al. |
| 6,749,933 B2 | 6/2004 | Dries et al. |
| 6,770,338 B1 | 8/2004 | Lind |
| 6,777,050 B1 | 8/2004 | Engelaere |
| 6,790,526 B2 | 9/2004 | Vargo et al. |
| 6,800,363 B2 | 10/2004 | Su et al. |
| 6,815,023 B1 | 11/2004 | Tatarka et al. |
| 6,844,079 B2 | 1/2005 | Holzer et al. |
| 6,858,313 B2 | 2/2005 | Musco et al. |
| 6,951,999 B2 | 10/2005 | Monforton et al. |
| 7,273,629 B2 | 9/2007 | Mudar et al. |
| 7,316,839 B2 | 1/2008 | Knauf |
| 7,393,593 B2 | 7/2008 | Roussos |
| 7,812,293 B2 | 10/2010 | Su et al. |
| 7,919,738 B2 | 4/2011 | Su et al. |
| 7,935,400 B2 | 5/2011 | Toft et al. |
| 8,007,882 B2 | 8/2011 | Toft et al. |
| 2002/0068182 A1 | 6/2002 | Kelch et al. |
| 2002/0179605 A1 | 12/2002 | Miani et al. |
| 2003/0148123 A1 | 8/2003 | Musco et al. |
| 2004/0052993 A1 | 3/2004 | Dawes |
| 2004/0069157 A1 | 4/2004 | Lin |
| 2005/0079372 A1 | 4/2005 | Schmal et al. |
| 2005/0136202 A1 | 6/2005 | Kendig et al. |
| 2005/0173050 A1 | 8/2005 | Peiffer et al. |
| 2006/0020067 A1 | 1/2006 | Brant et al. |
| 2006/0029823 A1 | 2/2006 | Brown |
| 2006/0138137 A1 | 6/2006 | Casale et al. |
| 2006/0182912 A1 | 8/2006 | Sato |
| 2006/0257056 A1 | 11/2006 | Miyake et al. |
| 2007/0048510 A1 | 3/2007 | Loretti et al. |
| 2007/0215609 A1* | 9/2007 | Su et al. ................. 219/730 |
| 2007/0248833 A1 | 10/2007 | Arent et al. |
| 2008/0095961 A1 | 4/2008 | Knauf |
| 2008/0220212 A1 | 9/2008 | Lin et al. |
| 2008/0311368 A1 | 12/2008 | Tukachinsky |
| 2009/0029149 A1 | 1/2009 | Kim et al. |
| 2011/0024412 A1 | 2/2011 | Su et al. |

FOREIGN PATENT DOCUMENTS

| | | |
|---|---|---|
| EP | 0214945 | 3/1987 |
| EP | 1488924 | 12/2004 |
| JP | 2005035567 | 2/2005 |
| JP | 2005088971 | 4/2005 |
| JP | 2006298467 | 11/2006 |
| WO | 9604178 | 2/1996 |
| WO | WO96/04178 * | 2/1996 |
| WO | 2005084937 | 9/2005 |

OTHER PUBLICATIONS

Office Action mailed May 20, 2010, for Canadian Patent Application Serial No. 2642278.

European Search Report dated Mar. 9, 2009, corresponding to European Patent Application No. 06848120.0.

International Preliminary Report on Patentability mailed Sep. 25, 2008, corresponding to International Application No. PCT/US2006/049209.

International Search Report mailed Jan. 8, 2008, corresponding to International Application No. PCT/US2008/050416.

Written Opinion of the International Search Authority mailed Jan. 8, 2008, corresponding to International Application No. PCT/US2008/050416.

International Search Report mailed Feb. 20, 2008, corresponding to International Application No. PCT/US2006/49209.

Written Opinion of the International Searching Authority mailed Feb. 20, 2008, corresponding to International Application No. PCT/US2006/49209.

Website page from Birds Eye: "Birds Eye Introduces Innovative Way to Steam Vegetables Perfectly—New Product Steams Right in the Bag," http:news/steamfresh.aspx, May 18, 2006.

International Preliminary Report on Patentability mailed Jul. 16, 2009, corresponding to International Application No. PCT/US2008/050416.

* cited by examiner

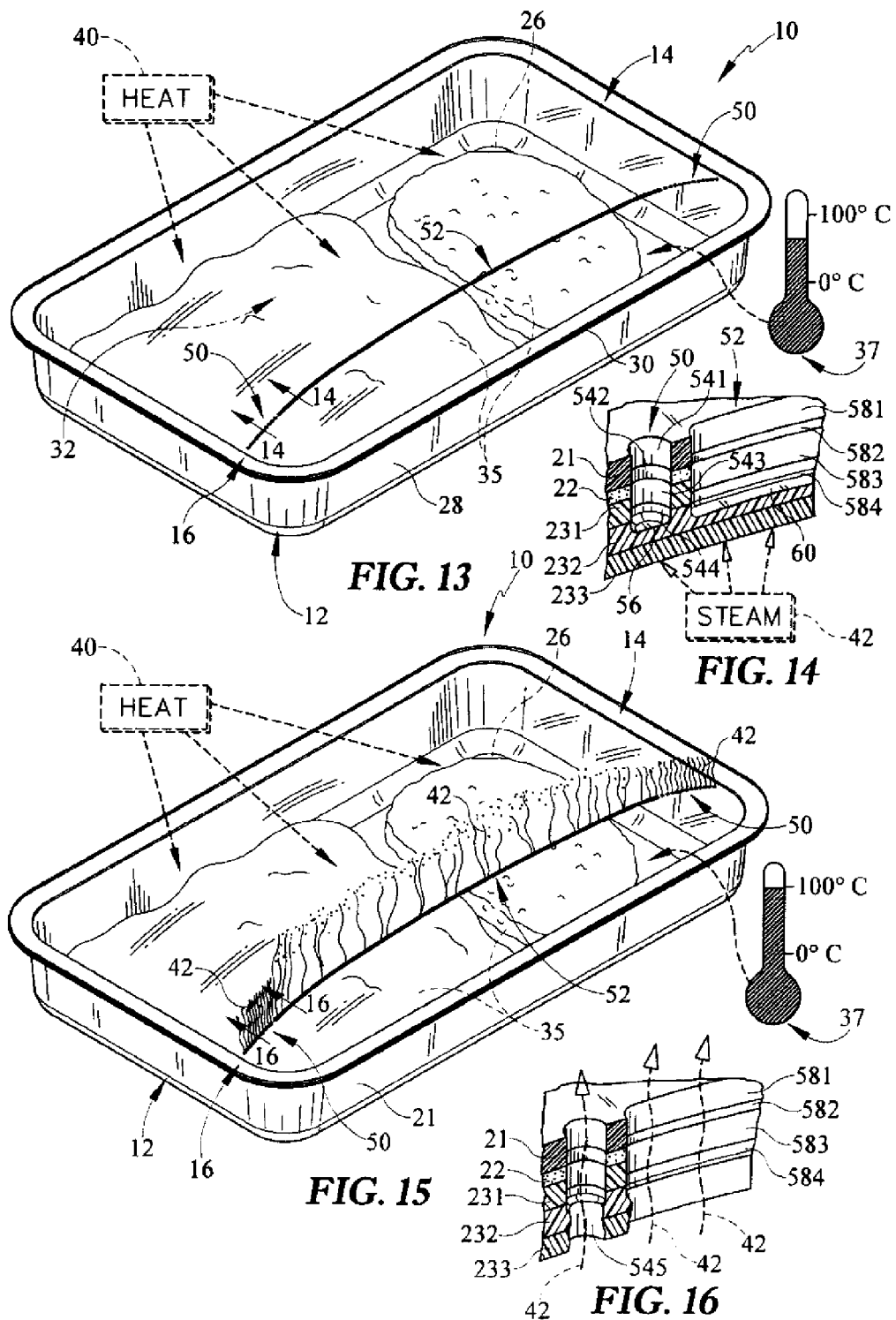

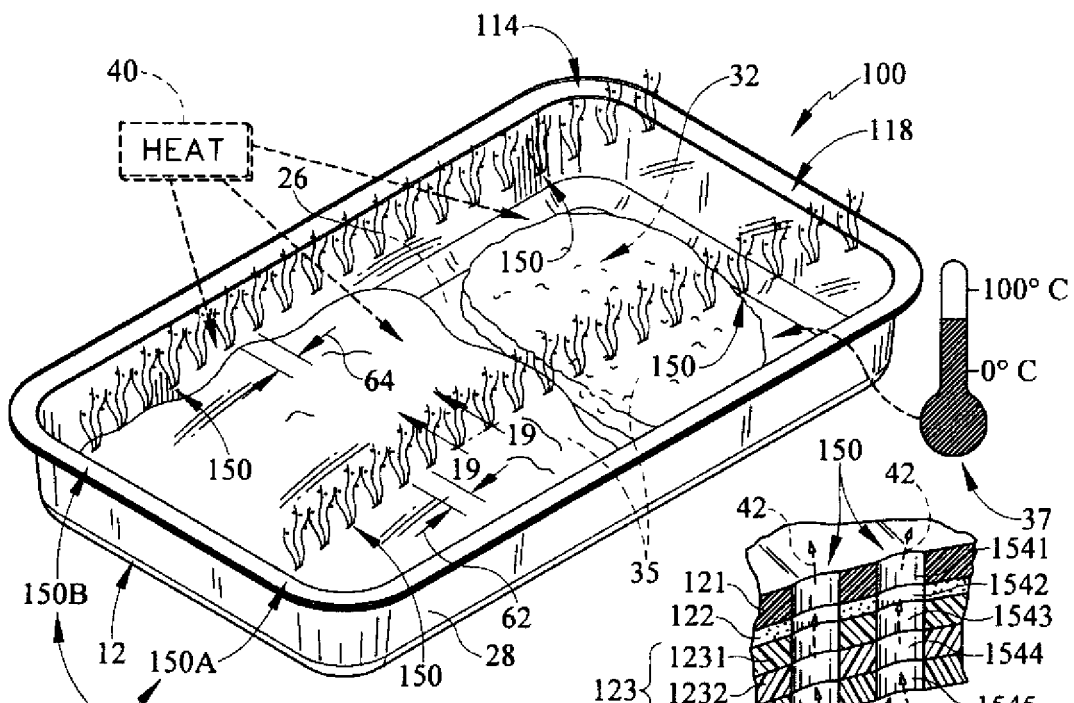
FIG. 18
FIG. 19
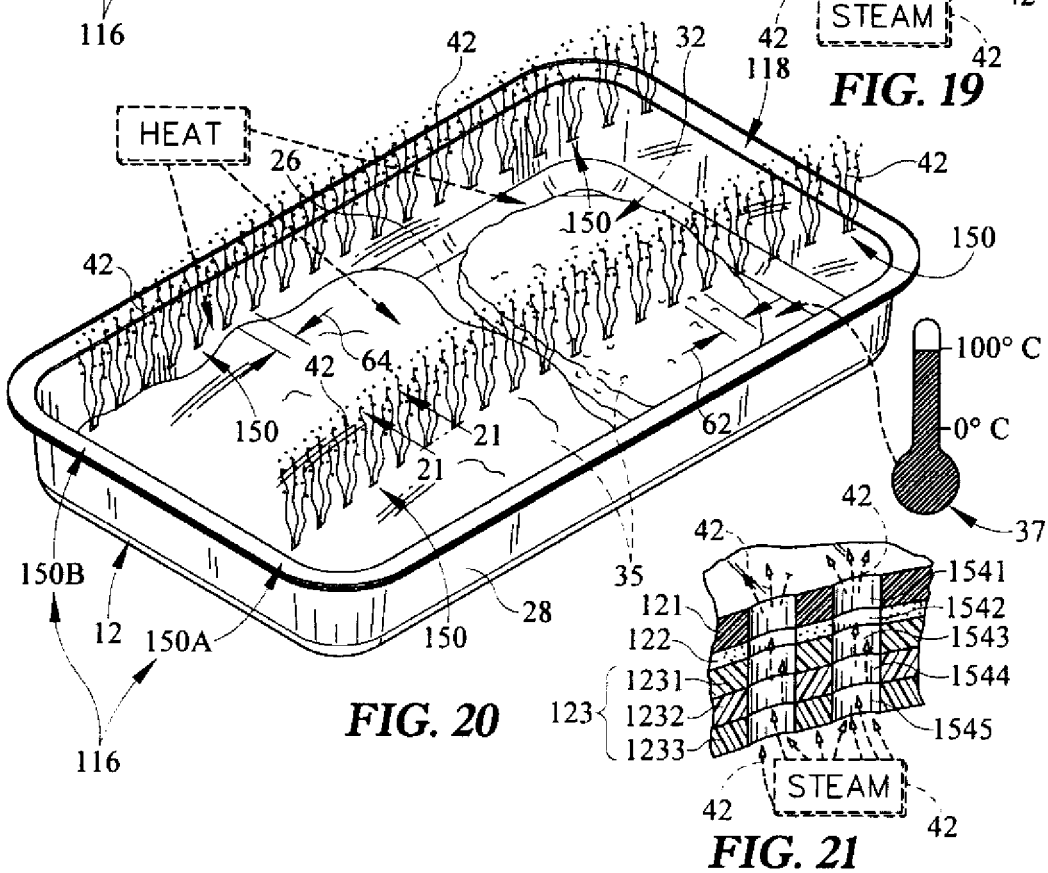
FIG. 20
FIG. 21

PEELABLE CLOSURE FOR CONTAINER

BACKGROUND

The present disclosure relates to a package, and in particular to a package including a container and closure for the container. More particularly, the present disclosure relates to a removable closure that can be separated from the container to open the package.

SUMMARY

A package in accordance with certain embodiments of the present disclosure includes a film used to establish a closure that is coupled to a brim included in the container by a bonding interface. The closure is coupled to a mouth opening into an interior region formed in the container to close the mouth.

In illustrative embodiments, a cold-durable, heat-resistant, peelable film is used to establish a closure. The cold-durable, heat-resistant, peelable film includes a sealant layer and a protective layer. The sealant layer includes bond-interface means provided at the bonding interface for causing the bond between the substrate and the sealant layer to remain intact while heat is applied to the package that causes pressure to be generated in the interior region of the container that applies an upward pulling force to the closure which is resisted so that the closure remains bonded to the brim of the container throughout heating of the package. The bond-interface means also causes the closure to peel easily away from the brim of the container in response to a sideways pulling force applied by a user to the closure so that the cold-durable, heat-resistant, peelable film remains intact upon separation of the closure from the brim. The upward pulling force is applied to the closure in a direction normal to a plane defined by the film when bonded to the brim of the container. The sideways pulling force is applied to the closure in such a way that at least a component of the force is in a direction parallel to the plane defined by the film. For the purposes of the present disclosure, the term "sideways" is intended to include a pulling force at an angle roughly parallel to the film plane as well as any angle up to and including being perpendicular to the film plane, and, in certain conditions, the angle may be greater than perpendicular.

In illustrative embodiments, the sealant layer is a multilayer polyolefin layer. The multilayer polyolefin layer includes, in series, an outer skin sub-layer, a core sub-layer, and an inner heat sealable sub-layer and the protective layer is bonded to the outer skin sub-layer.

In illustrative embodiments, the sealant layer is a monolayer polyolefin layer. The monolayer polyolefin layer is bonded to the protective layer.

In illustrative embodiments, the sealant layer is a multilayer polyolefin layer. The protective layer is included as the outer skin sub-layer.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a package undergoing freezing showing that the rectangular container and the closure are subjected to below freezing temperatures as indicated by a thermometer bar to the right of the package that shows a below-freezing temperature of air in an interior region formed in the container;

FIG. 2 is a perspective view of the package of FIG. 1 showing that the package is being exposed to heat which causes the temperature in the interior region to increase as shown by the thermometer bar to the right of the package, steam to be formed in the interior region which forms an upwards pulling force to be applied to the closure causing the closure to bulge outwardly, and steam to escape in a controlled manner through a steam-venting system formed in the closure;

FIG. 3 is a perspective view of the package of FIG. 1 showing opening of the package which occurs after heating has ceased and the temperature in the interior region has had time to decrease, as shown by the thermometer bar to the right of the package, and showing that as the temperature falls, the amount of steam escaping from the steam-venting system decreases and a user is able to apply a sideways pulling force to the closure to cause the closure to peel back from a brim included in the container to expose food products in the interior region;

FIGS. 13-16 are a series of views showing use of a hermetic steam-venting system formed in a right side of a closure that is configured to release steam generated in an interior region of a container in a controlled manner during heating of the package after sufficient steam pressure is generated so that pressure and temperature in the interior region are controlled;

FIG. 13 is a perspective view of a package undergoing heating showing that the package includes a hermetic steam-venting system formed in a right side of the closure of the package and that during initial stages of heating, steam is generated in an interior region of the package causing pressure to be exerted onto the closure and forcing the closure to bulge outwardly until sufficient pressure and temperature are achieved to cause the steam to rupture the hermetic steam-venting system and escape from the interior region as suggested in FIGS. 15 and 16;

FIG. 14 is a sectional view taken along line 14-14 of FIG. 13 showing that the venting system includes a series of spaced-apart bore holes that extend downwardly through the closure and terminate at a bore-hole floor in a core sub-layer included in a sealant layer of the closure and an elongated bore slot that extends downwardly through the closure, and terminates at a bore-slot floor formed in the core sub-layer;

FIG. 15 is a view similar to FIG. 13 showing the package after continued heating and showing that steam has caused the hermetic steam-venting system to rupture allowing steam to pass through the closure from the interior region to the atmosphere surrounding the package so that pressure and temperature in the interior region are controlled throughout the remainder of the package heating;

FIG. 16 is a sectional view taken along line 16-16 of FIG. 15 showing that the steam has ruptured the floors of the bore holes and the bore slot permitting steam to pass through steam passageways formed by each bore hole and bore slot from the interior region of the container to the atmosphere outside the package;

FIGS. 18-21 are a series of views showing use of an opened steam-venting system formed in a closure that is configured to release steam generated in an interior region of a container in a controlled manner throughout heating of the package so that pressure and temperature in the interior region are controlled;

FIG. 18 is a perspective view of a package undergoing heating showing that the package includes an opened steam-venting system formed in a closure of the package and that during initial stages of heating, steam is generated in an interior region of the package causing pressure to be exerted onto the closure and forcing the closure to bulge outwardly while allowing a portion of the steam generated in the interior region to escape continually from the interior region as suggested in FIGS. 19-21;

FIG. 19 is a sectional view taken along line 19-19 of FIG. 18 showing that the opened steam-venting system includes a series of spaced-apart slits formed in an outer protective layer of the closure and arranged to open into a slit passageway formed in the closure to allow steam to move in a controlled manner from the interior region of the package through the slit passageway to atmosphere outside the package during heating of the package;

FIG. 20 is a view similar to FIG. 18 showing that as heating of the package continues, temperatures in the interior region of the container continue to increase producing additional steam which passes through the closure to the atmosphere thereby controlling temperature and pressure in the interior region as suggested in FIGS. 22 and 23;

FIG. 21 is a sectional view taken along line 21-21 of FIG. 20 showing that as heating continues more steam is allowed to escape through the venting system so that pressure and temperature in the interior region are controlled;

FIG. 23 is a perspective view of another embodiment of a package undergoing heating showing that the package includes a closure coupled to a container to enclose an interior region formed in the container and contain steam generated during heating of the container;

FIG. 24 is a view similar to FIG. 23 showing that the hermetic steam-venting system forms in the package as steam pressure applies a sufficient Fup to the closure to cause a portion of the closure to separate from a brim included in the container to cause a steam passageway to be established between the closure and the brim so that steam pressure and temperature in the interior region is controlled during heating;

FIG. 25 is a view similar to FIG. 24 showing opening of the package which occurs after heating has ceased and the temperature in the interior region has had time to decrease, as shown by the thermometer bar to the right of the package, and showing that as the temperature falls, the amount of steam escaping from the steam-venting system decreases and a user is able to apply a sideways pulling force to the closure to cause the closure to peel back from a brim included in the container to expose food products in the interior region;

FIG. 26 is an enlarged partial perspective view of the hermetic steam-venting system of FIG. 25;

FIG. 28 is a perspective view of another embodiment of a package showing that the package includes a cylindrical container and a circular lid including a closure made from a cold-durable, heat-resistant peelable film and rim arranged to mate with a brim included in the container;

FIG. 29 is a perspective view of the package of FIG. 28 showing opening of the package by a user applying a sideways pulling force to the closure to cause the closure to peel back from the rim of the lid which is coupled to a brim included in the container to gain access to the interior region;

FIG. 30 is an exploded assembly view showing that the package includes, from top to bottom, a lid, a bonding interface, and a container, and suggesting that the bonding interface couples the lid to the container; and FIG. 31 is an exploded assembly view of the lid of FIG. 30 showing that the lid includes, from top to bottom, the closure made from the cold-durable, heat-resistant, peelable film and the rim which is configured to mate the lid to the brim of the container.

DETAILED DESCRIPTION

Figure 1:
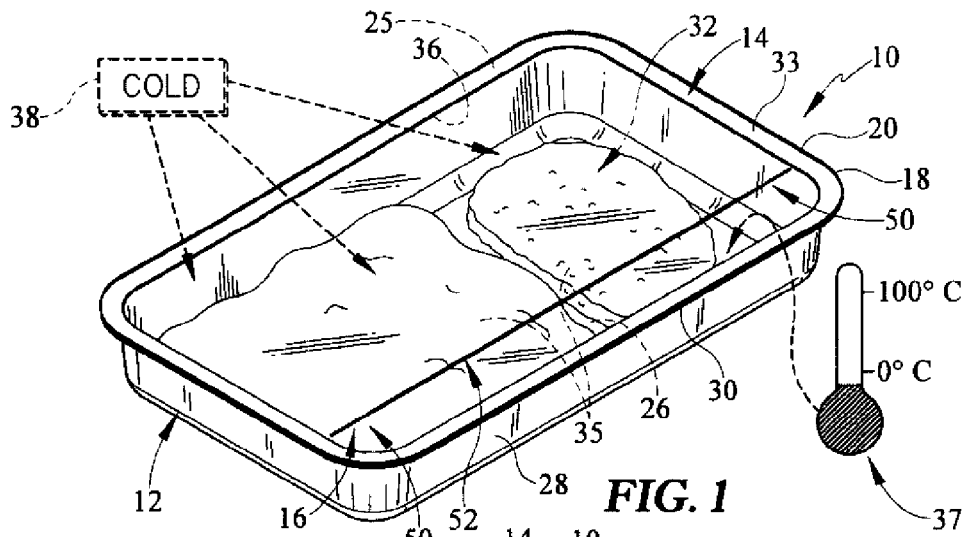
FIGS. 1-3 are a series of views showing a first embodiment of a package including a rectangular container and a closure formed from a cold-durable, heat-resistant, peelable film undergoing freezing as suggested in FIG. 1, undergoing heating as suggested in FIG. 2, and undergoing easy peeling to open the package after heating as suggested in FIG. 3.
Figure 2:
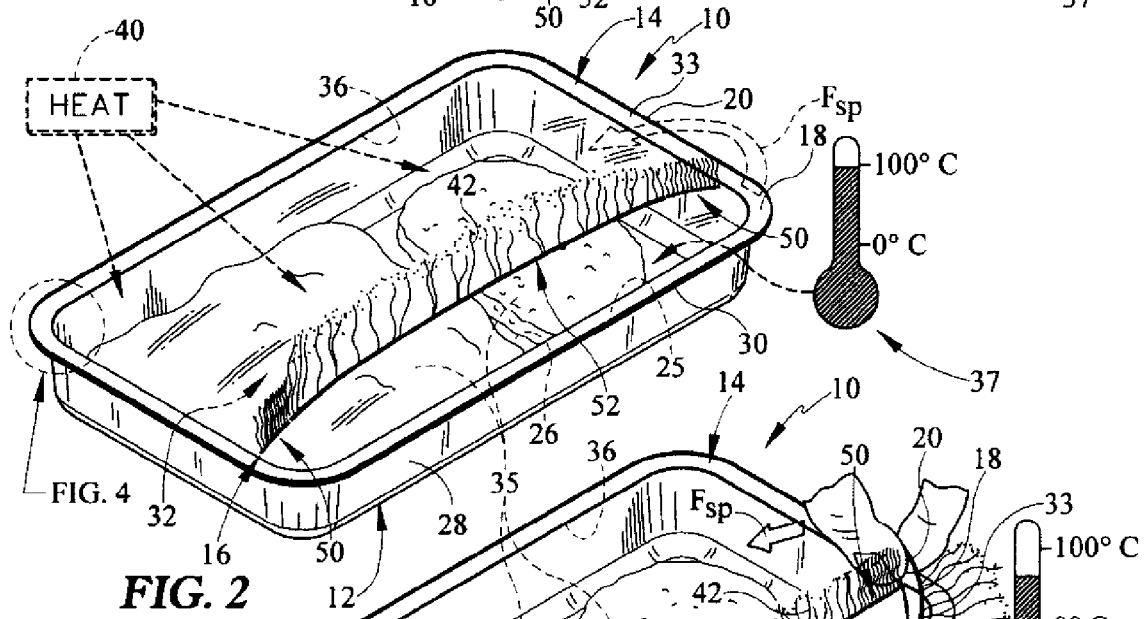
Figure 3:
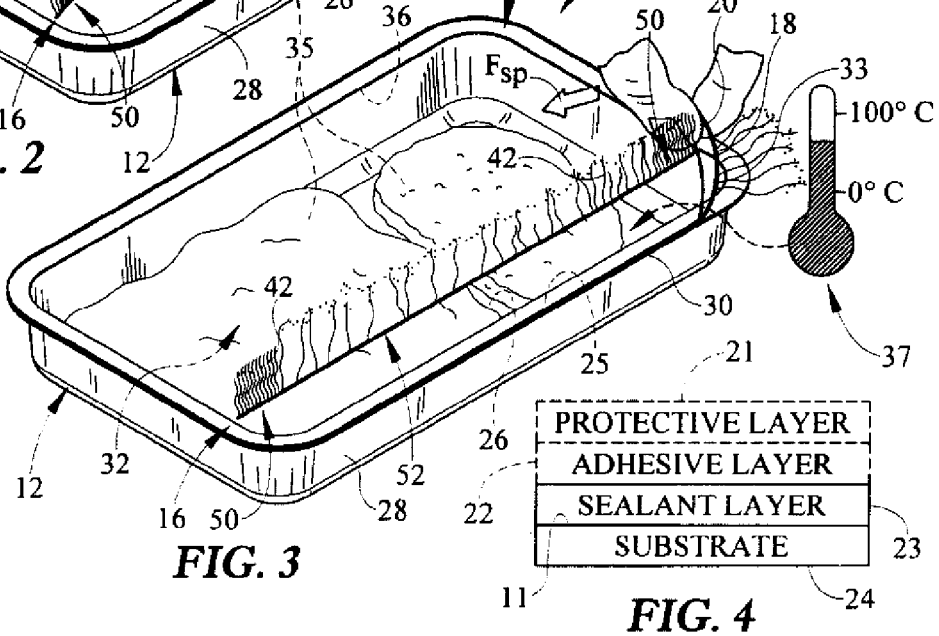
Figure 4:
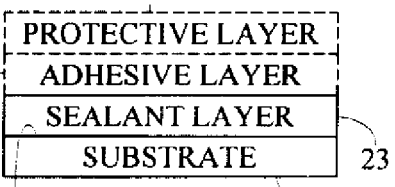
FIG. 4 is a diagrammatic view of the cold-durable, heat-resistant, peelable film included in the closure of FIGS. 1-3 showing that the peelable film includes a sealant layer coupled to a substrate included in the container and may include a protective layer (shown in phantom) coupled to the sealant layer by an adhesive layer (shown in phantom)

A first illustrative embodiment of a package 10 in accordance with the present disclosure includes a container 12, a closure 14 configured to mount on container 12, and a steam-venting system 16 formed in closure 14 as shown in FIGS. 1-3. Closure 14 is formed using a cold-durable, heat-resistant, peelable film 18 as shown in FIG. 4. Peelable film 18 is durable when exposed to freezing temperatures as suggested in FIG. 1, is resistant to melting when exposed to heating temperatures as suggested in FIG. 2, and is peelable after heating by a user applying a sideways peeling force Fsp to an edge 20 of closure 14 as shown in FIG. 3.

Peelable film 18 illustratively includes, from top to bottom, a protective layer 21, a sealant layer 23, and an adhesive layer 22 coupling protective layer 21 to sealant layer 23 as shown, for example, in FIG. 4. Sealant layer 23 is configured to have properties which provide cold durability, heat resistance, and easy peelability when sealant layer 23 is coupled to a substrate 24 included in container 12. Other embodiments of peelable films in accordance with the present disclosure are shown in FIGS. 5-12. Various embodiments of steam-venting systems in accordance with the present disclosure are shown in FIGS. 13-23. The peelable film may be included as part of a package used for storing refrigerated foods, sterilizing foods, sterilizing medical products, sterilizing child products such as baby bottles and child pacifiers, and cooking food products. Alternatively, the peelable film 18 may be adapted for use with industrial or other containers as a venting system.

Container 12 of package 10 includes a floor 26, a side wall 28 extending upwardly from a perimeter edge of floor 26 and terminating at a container brim 30 as shown, for example, in FIGS. 1-3. Floor 26 and side wall 28 cooperate to form an interior product-storage region 32 which receives package contents therein. As an example, package contents may be frozen-food products 35 as shown in FIGS. 1-3. Container brim 30 includes an upwardly facing closure-receiving surface 25 and is formed to include an inner edge 36 that defines a mouth opening into interior product-storage region 32 as suggested in FIGS. 1-3.

Figure 2A:
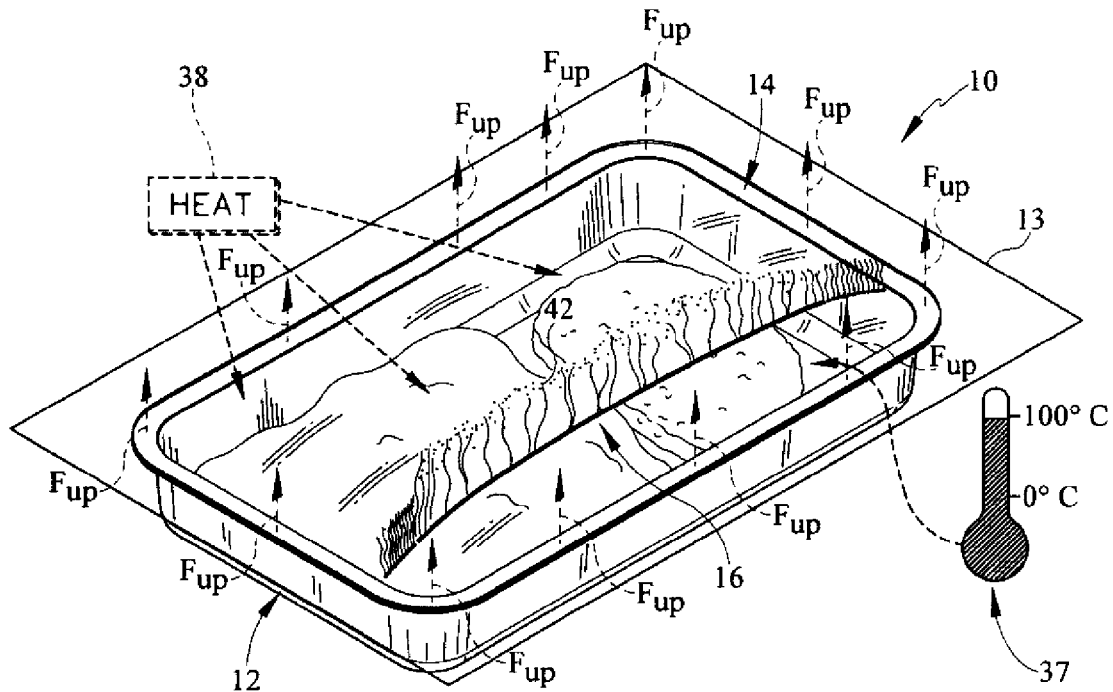
FIG. 2A is a view similar to FIG. 2 showing the upwards pulling forces being applied to the closure of the package by steam inside the interior region of the container which attempts to separate the closure from the brim included in the container and suggesting that the closure remains coupled to the brim until the sideways pulling force is applied to the closure as suggested in FIG. 3A.
Figure 3A:
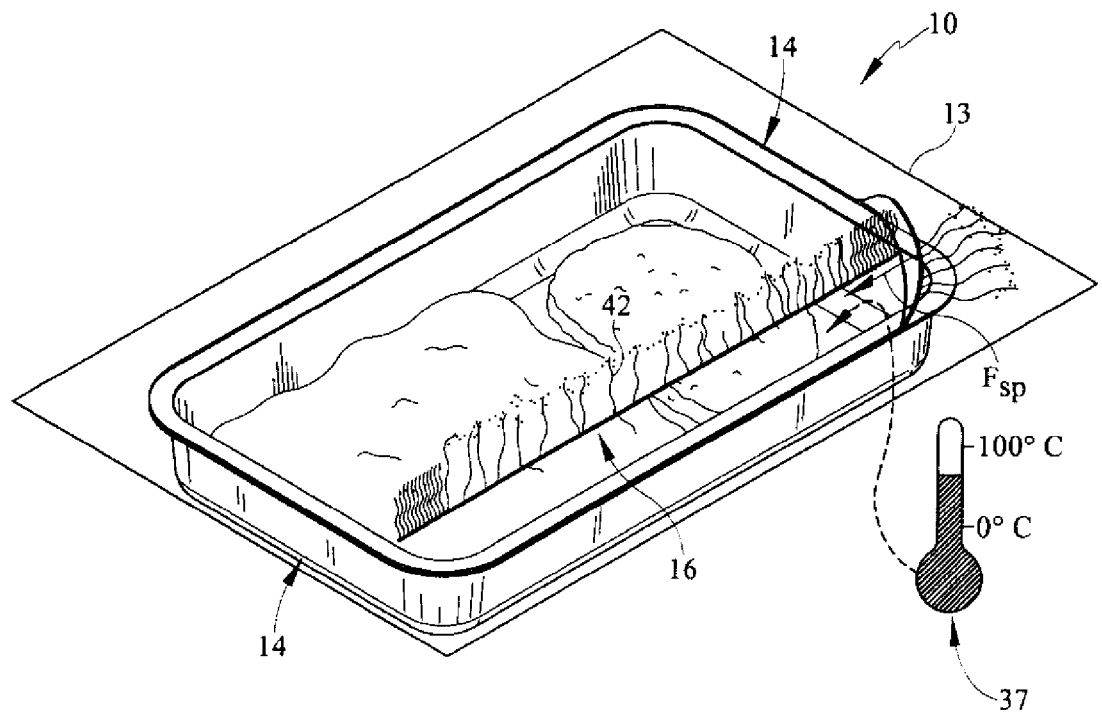
FIG. 3A is a view similar to FIG. 3 showing the sideways pulling force being applied to the closure causing the closure to peel away from the brim of the container in one piece.

Closure 14 is formed as a result of coupling cold-durable, heat-resistant, peelable film 18 to closure-receiving surface 25 of container 12. As an example, peelable film 18 is coupled to brim 30 of container 12 by a bonding interface 11. Bonding interface 11, for example, is heat sealing, but may be gluing or any other suitable alternative. During heating of package 10, heat is applied to package 10 that causes pressure to increase in interior product-storage region 32 of container 12. The pressure in turn applies an upwards pulling (tensile) force Fup to closure 14 as shown in FIG. 2A.

Upwards pulling force Fup applies an upward separation-inducing load on closure 14 that is resisted by bonding interface 11 so that closure 14 remains bonded to brim 30 during heating of package 10. Cold-durable, heat-resistant, peelable film 18 includes a sealant layer 23 configured to provide means for causing the bond between substrate 24 and sealant layer 23 to remain intact while cold 38 is applied to package 10. Heat 40 in turn causes pressure to be generated in interior region 32 that applies upward pulling force Fup to closure 14 and is resisted so that closure 14 remains bonded to brim 30 of the container 12 throughout heating of package 10. As illustrated in FIG. 2A, upward pulling force Fup is applied to closure 14 in a direction normal to a plane 13 defined by peelable film 18 when peelable film 18 is bonded to brim 30.

After heating of package 10 has completed, a user gains access to interior product-storage region 32 by peeling closure 14 away from brim 30 as shown in FIG. 3. Peeling means applying a load to closure 14 that includes a sideways pulling (shear) force Fsp to cause closure 14 to be separated from brim 30 along one or two separation fronts in which bond interface 11 is overcame by sideways pulling force Fsp. A separation front is established at a location where sideways pulling force Fsp overcomes bond interface 11 and closure 14 separates from brim 30. As suggested in FIG. 3, sideways pulling force Fsp is a force applied to closure 14 in a direction parallel to plane 13. Sealant layer 23 of peelable film 18 is further configured to provide means for causing closure 14 to peel easily away from brim 30 of container 12 in response to application of sideways pulling force Fsp by a user to closure 14 so that closure 14 remains in one piece upon separation from brim 30.

A consumer gains access to product stored in interior product-storage region 32 formed in container 12 such as by applying the load including sideways pulling force Fsp to edge 20 of closure 14 causing closure 14 to peel easily away from container brim 30 as suggested in FIG. 3. As an example, edge 20 is formed during manufacture of package 10 when bond interface 11 is formed that seals peelable film 18 to substrate 24. As a result, excess material 33 extends beyond bond interface 11 away from the mouth of container 12. After bond interface 11 has been established between closure 14 and container 12, package 10 may be stored in a freezer and then heated at a later time as suggested in FIGS. 2 and 3.

Figure 5:
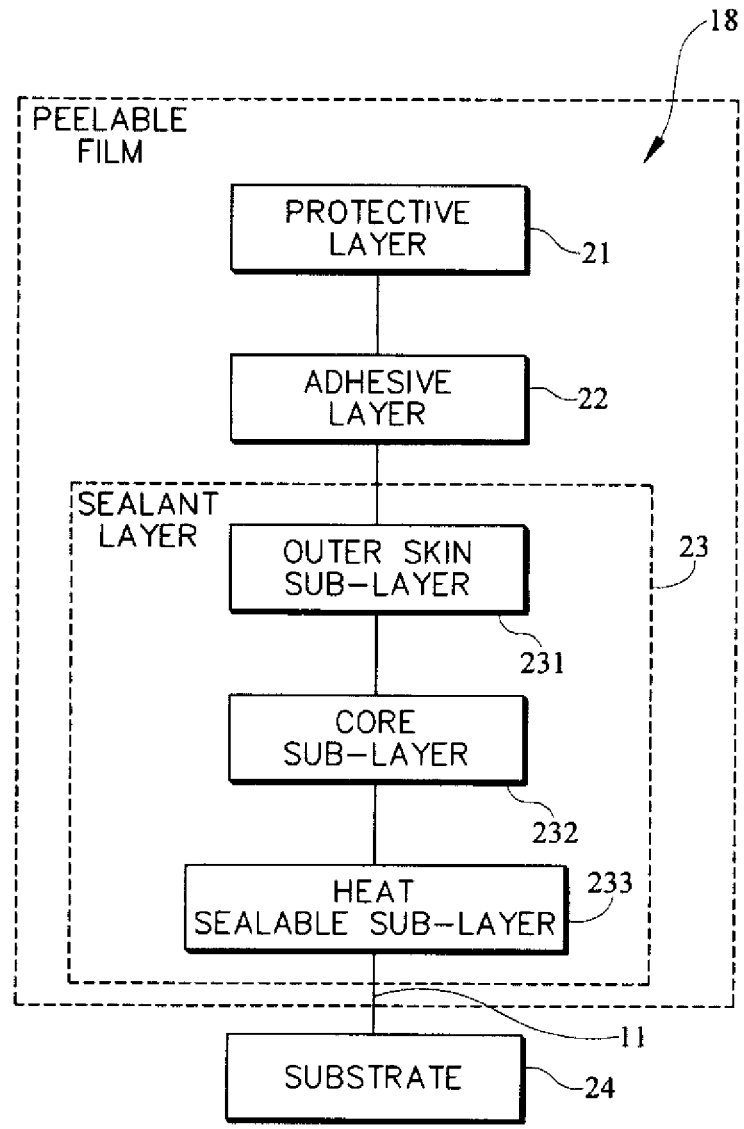
FIG. 5 is a diagrammatic view of a second embodiment of a cold-durable, heat-resistant, peelable film that is coupled to a substrate included in a package and showing that the peelable film includes, from top to bottom, a protective layer, an adhesive layer, and a sealant layer including, in series, an outer skin sub-layer, a core sub-layer, and a heat sealable sub-layer.

Cold-durable, heat-resistant, peelable film 18 includes sealant layer 23 as shown in FIGS. 4 and 5. In some embodiments, peelable film 18 further includes a protective layer 21 and an adhesive layer 22 which is used to couple protective layer 21 to sealant layer 23. As an example, sealant layer 23 includes an outer skin sub-layer 231, a core sub-layer 232, and a heat sealable sub-layer 233 as shown in FIG. 5. As used in the present disclosure, sub-layer means a layer included in a composition comprising several layers, for example, sealant layer 23, and is not meant to indicate position with respect to any other layer.

In use, outer skin sub-layer 231 is configured to resist heat and steam generated during heating and maintain form when exposed to such hot temperatures as suggested in FIGS. 2 and 3. Heat sealable sub-layer 233 is configured to resist freezing temperatures, maintain durability when exposed to such freezing temperatures as suggested in FIG. 1, and have a relatively low seal initiation temperature. Core sub-layer 232 is configured to lie between and interconnect outer skin sub-layer 231 and heat sealable sub-layer 233 as shown in FIG. 5 and resist heat and steam generated during heating and maintain form when exposed to such hot temperatures as suggested in FIG. 5.

In one example of use, package 10 is prepared in a factory with food 35 located in interior product-storage region 32 of container 12. Closure 14 is then coupled to container 12 to enclose food 35 in interior product-storage region 32. Container 12 may then be stored in a freezer for long periods of time where container 12 and food 35 are exposed to cold 38 as shown in FIG. 1. As a result, temperatures in interior product-storage region 32 of container 12 may be maintained below 0° C. as measured by a thermometer bar 37 as shown in FIG. 1.

In another example of use, package 10 may be exposed to heat 40 by placing package 10 into a heating device. In one example, heat 40 is produced by microwave energy and the heating device is a microwave oven. In another example, heat may be produced by thermal energy and the heating device may be a heating element in a conventional gas or electric oven. In another example, heat is produced by electromagnetic energy and the heating device may be an induction heating element in an oven. In another example, heat is produced through transferring thermal energy by convection from a hot fluid to the package.

As a result, temperatures in interior product-storage region 32 increase to a point where steam 42 is generated in interior product-storage region 32 as measured by thermometer bar 37 shown in FIG. 2. As steam 42 is generated, steam-venting system 16 formed in closure 14 is configured to provide means for controlling steam pressure generation in interior product-storage region 32 so that food 35 is heated uniformly throughout without creating upwards pulling forces Fup that overcome bonding interface 11 and cause closure 14 to separate from container brim 30 during heating. As shown in FIG. 1, steam-venting system 16 is a hermetic steam-venting system 16 that substantially encloses and blocks the movement of fluids between interior product-storage region 32 and atmosphere surrounding package 10 until sufficient heating has occurred.

In another example of use, package 10 is left to cool after heating so that a user may open package 10. As shown in FIG. 3, the user waits until the temperature in interior product-storage region 32 has decreased as measured by thermometer bar 37 in FIG. 3. Once sufficiently cool, the user grasps excess material 33 and applies sideways pulling force Fsp to excess material 33 causing closure 14 to be peeled easily away from container brim 30 of container 12 as shown in FIG. 3. Peelable film 18 is configured to provide means for peeling closure 14 away from container brim 30 to cause closure 14 to be separated from at least a portion of container brim 30 in one piece so that a clean separation is achieved while minimizing sideways pulling force Fsp required to peel closure 14 away from container brim 30 while allowing upwards pulling force Fup to be resisted during heating.

Package 10 is able to resist upwards pulling force Fup applied to closure 14 during heating while still being able to peel easily away from container 12 when sideways pulling force Fsp is applied. Peelable film 18 includes protective layer 21, adhesive layer 22, and a multilayer polyolefin sealant layer 23 as shown in FIG. 5. As an example, protective layer 21 is laminated to sealant layer 23 by adhesive layer 22. Sealant layer 23 is coupled to a substrate 24 by bonding interface 11. Sealant layer 23 illustratively includes an outer skin sub-layer 231, a core sub-layer 232, and a heat sealable sub-layer 233.

Substrate 24, for example, may be a container or a layer of material included in a container. In one illustrative example, a container may include a tray made of paper and a substrate coupled to the tray to line the tray and couple to peelable film 18 to enclose a product-storage region defined by the tray and the substrate. In another example, a container may include a tray made of polypropylene that couples to peelable film 18 to enclose an interior region defined by the tray.

Figure 6:
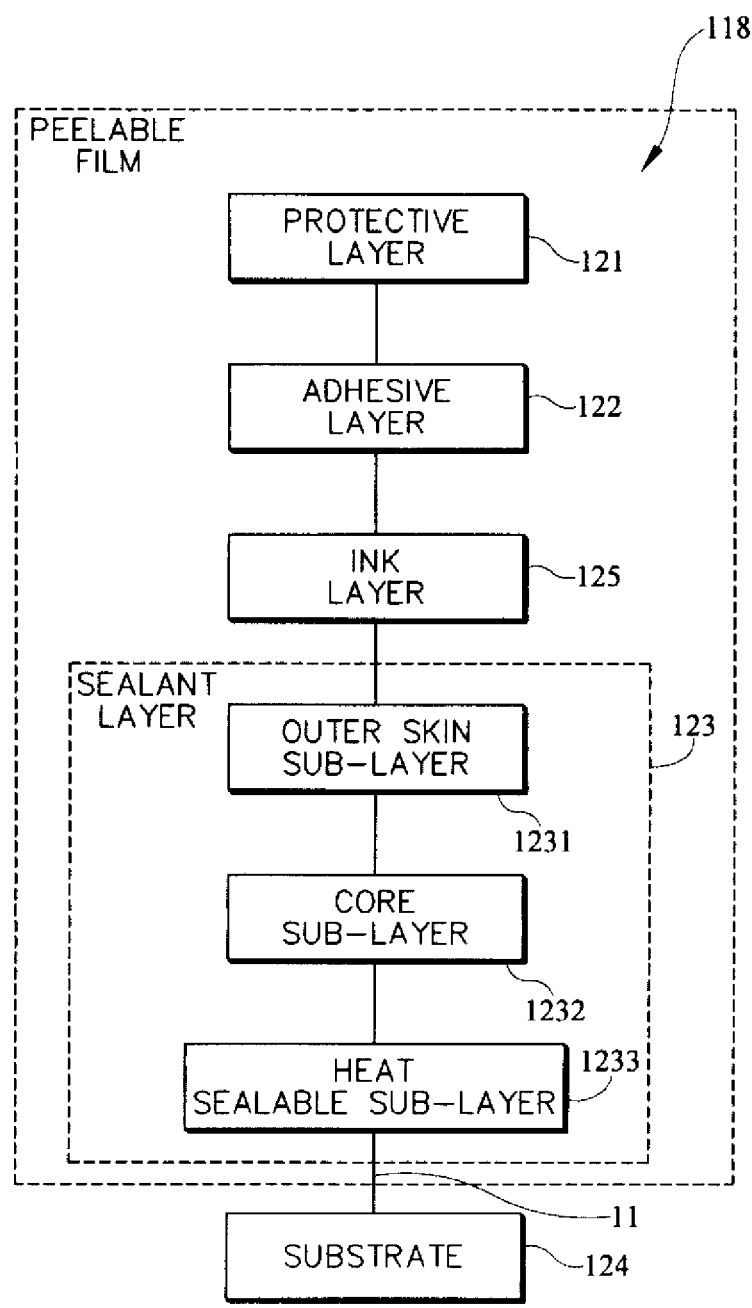
FIG. 6 is a diagrammatic view of a third embodiment of a cold-durable, heat-resistant, peelable film showing that the peelable film includes, from top to bottom, a protective layer, an adhesive layer, an ink layer, and a sealant layer including, in series, an outer skin sub-layer, a core sub-layer, and a heat sealable sub-layer.

Another illustrative embodiment of a peelable film 118 in accordance with the present disclosure includes a protective layer 121, an adhesive layer 122, an ink (printed graphic) layer 125, and a multilayer polyolefin sealant layer 123 as shown in FIG. 6. Sealant layer 123 is coupled to a substrate 124 by interface bond 11. Sealant layer 123 illustratively includes a printed outer skin sub-layer 1231, a core sub-layer 1232, and a heat sealable sub-layer 1233. Protective layer 121 is laminated to printed outer skin sub-layer 1231 by adhesive layer 122. Substrate 124 may be a container or a layer of material in a container. In one example, a container may include a tray made of paper and a substrate coupled to the tray to line the tray and couple to peelable film 118 to enclose an interior region defined by the tray and the substrate. In another example, a container may include a tray made of polypropylene that couples to peelable film 118 to enclose an interior region defined by the tray.

Figure 7:
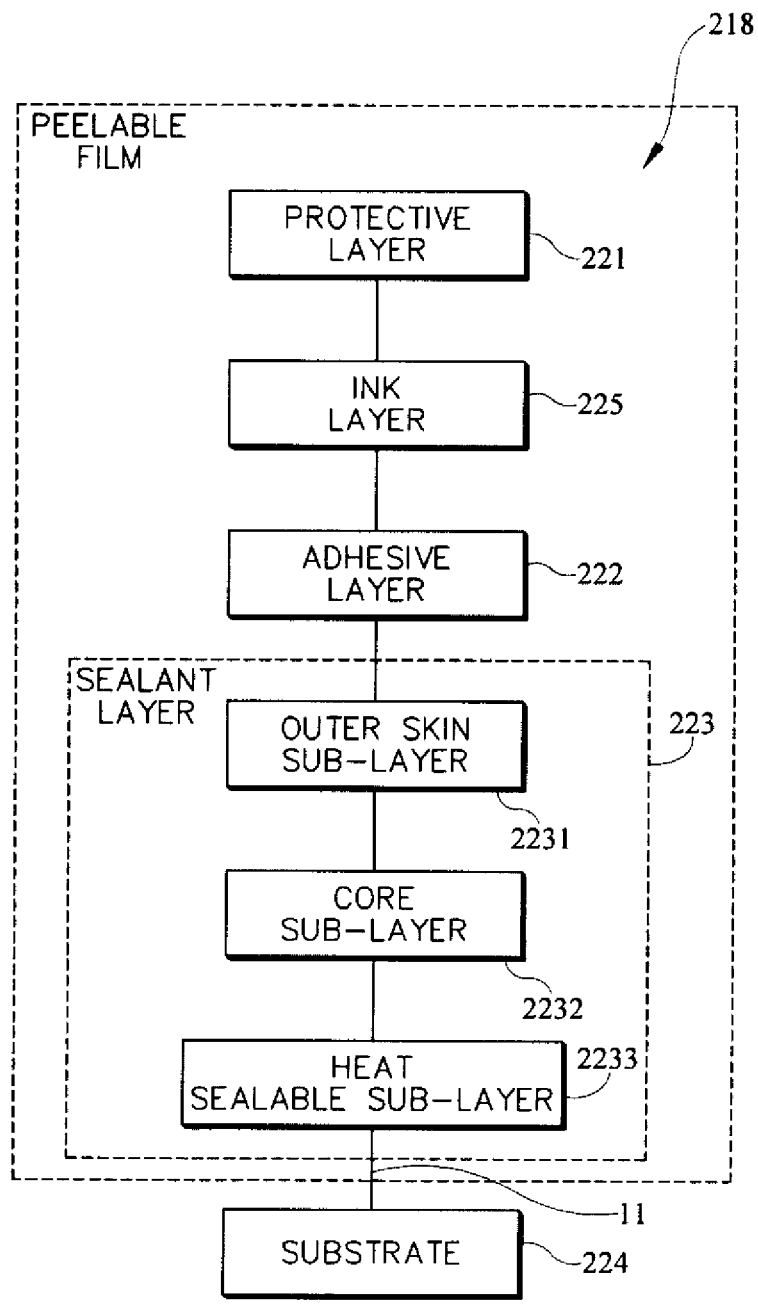
FIG. 7 is a diagrammatic view of a fourth embodiment of a cold-durable, heat-resistant, peelable film showing that the peelable film includes, from top to bottom, a protective layer, an ink layer, an adhesive layer, and a sealant layer including, in series, an outer skin sub-layer, a core sub-layer, and a heat sealable sub-layer.

Another illustrative embodiment of a peelable film 218 in accordance with the present disclosure includes a protective layer 221, an ink (printed graphic) layer 225, an adhesive layer 222, and a multilayer polyolefin sealant layer 223 as shown in FIG. 7. Sealant layer 223 is coupled to a substrate 224 by interface bond 11. Sealant layer 223 illustratively includes outer skin sub-layer 2231, a core sub-layer 2232, and a heat sealable sub-layer 2233. Printed protective layer 221 is laminated to outer skin sub-layer 2231 by adhesive layer 222. Substrate 224 may be a container or a layer of material in a container. In one example, a container may include a tray made of paper and a substrate coupled to the tray to line the tray and couple to peelable film 218 to enclose an interior region defined by the tray and the substrate. In another example, a container may include a tray made of polypropylene that couples to peelable film 218 to enclose an interior region defined by the tray.

Figure 8:
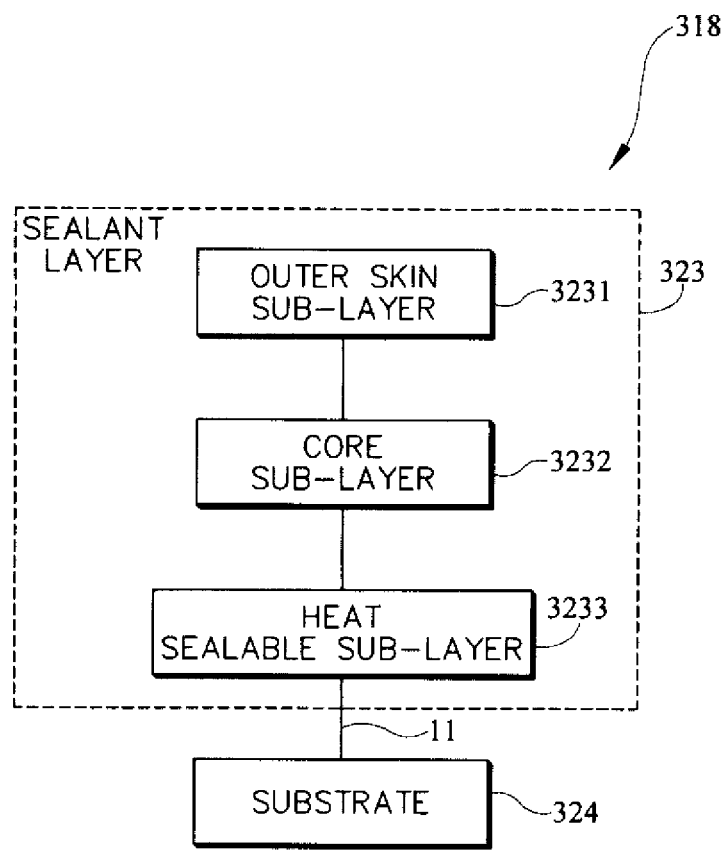
FIG. 8 is a diagrammatic view of a fifth embodiment of a cold-durable, heat-resistant, peelable film showing that the peelable film includes, from top to bottom, a sealant layer comprising, in series, an outer skin sub-layer, a core sub-layer, and a heat sealable sub-layer.

Another illustrative embodiment of a peelable film 318 in accordance with the present disclosure includes a multilayer polyolefin sealant layer 323 as shown in FIG. 8. Sealant layer 323 is coupled to a substrate 324 by interface bond 11. Sealant layer 323 illustratively includes an outer skin sub-layer 3231, a core sub-layer 3232, and a heat sealable sub-layer 3233. Substrate 324 may be a container or a layer of material in a container. In one example, a container may include a tray made of paper and a substrate coupled to the tray to line the tray and couple to peelable film 318 to enclose an interior region defined by the tray and the substrate. In another example, a container may include a tray made of polypropylene that couples to peelable film 318 to enclose an interior region defined by the tray.

Figure 9:
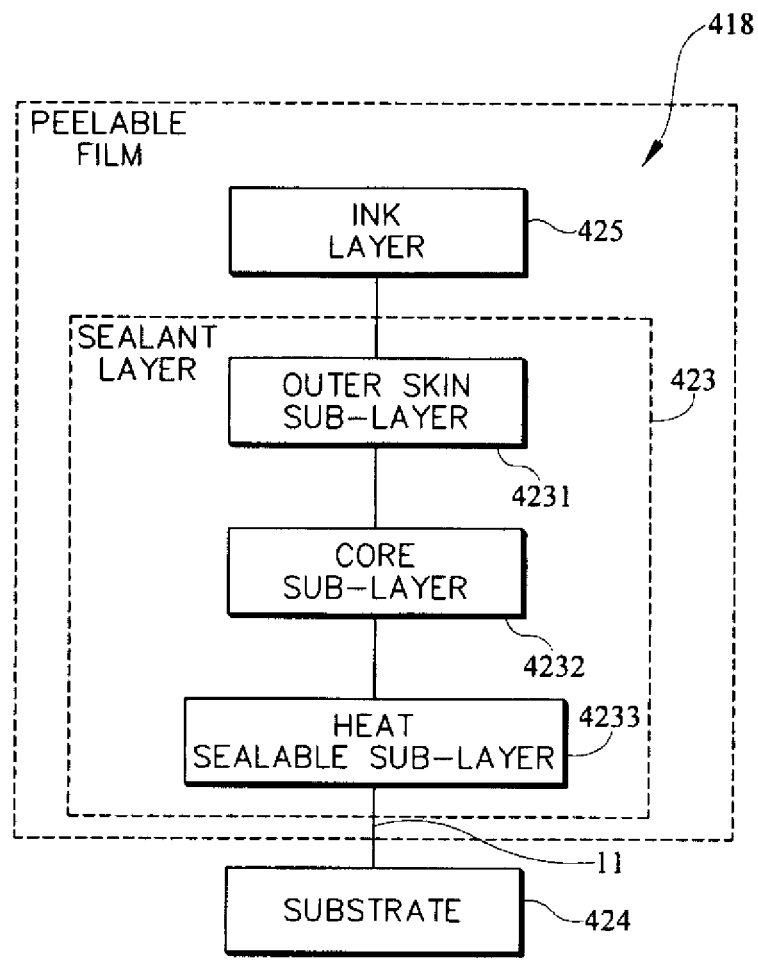
FIG. 9 is a diagrammatic view of a sixth embodiment of a cold-durable, heat-resistant, peelable film showing that the peelable film includes, from top to bottom, an ink layer and a sealant layer including, in series, an outer skin sub-layer, a core sub-layer, and a heat sealable sub-layer.

Another illustrative embodiment of a peelable film 418 in accordance with the present disclosure includes an ink (printed graphic) layer 425 and a multilayer polyolefin sealant layer 423 as shown in FIG. 9. Sealant layer 423 is coupled to a substrate 424 by interface bond 11. Sealant layer 423 illustratively includes a printed outer skin sub-layer 4231, a core sub-layer 4232, and a heat sealable sub-layer 4233. Substrate 424 may be a container or a layer of material in a container. In one example, a container may include a tray made of paper and a substrate coupled to the tray to line the tray and couple to peelable film 418 to enclose an interior region defined by the tray and the substrate. In another example, a container may include a tray made of polypropylene that couples to peelable film 418 to enclose an interior region defined by the tray.

Figure 10:
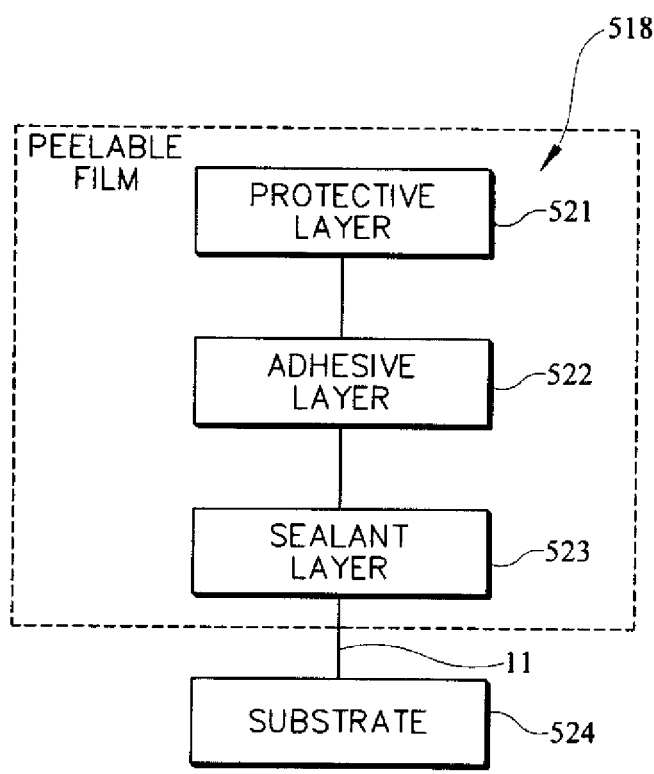
FIG. 10 is a diagrammatic view of a seventh embodiment of a cold-durable, heat-resistant, peelable film showing that the peelable film includes, from top to bottom, a protective layer, an adhesive layer, and a sealant layer.

Another illustrative embodiment of a peelable film 518 in accordance with the present disclosure includes a protective layer 521, an adhesive layer 522, and a monolayer polyolefin sealant layer 523 as shown in FIG. 10. Protective layer 521 is laminated to sealant layer 523 by adhesive layer 522. Sealant layer 523 is coupled to a substrate 524 by interface bond 11. Substrate 524 may be a container or a layer of material in a container. In one example, a container may include a tray made of paper and a substrate coupled to the tray to line the tray and couple to peelable film 518 to enclose an interior region defined by the tray and the substrate. In another example, a container may include a tray made of polypropylene that couples to peelable film 518 to enclose an interior region defined by the tray.

Figure 11:
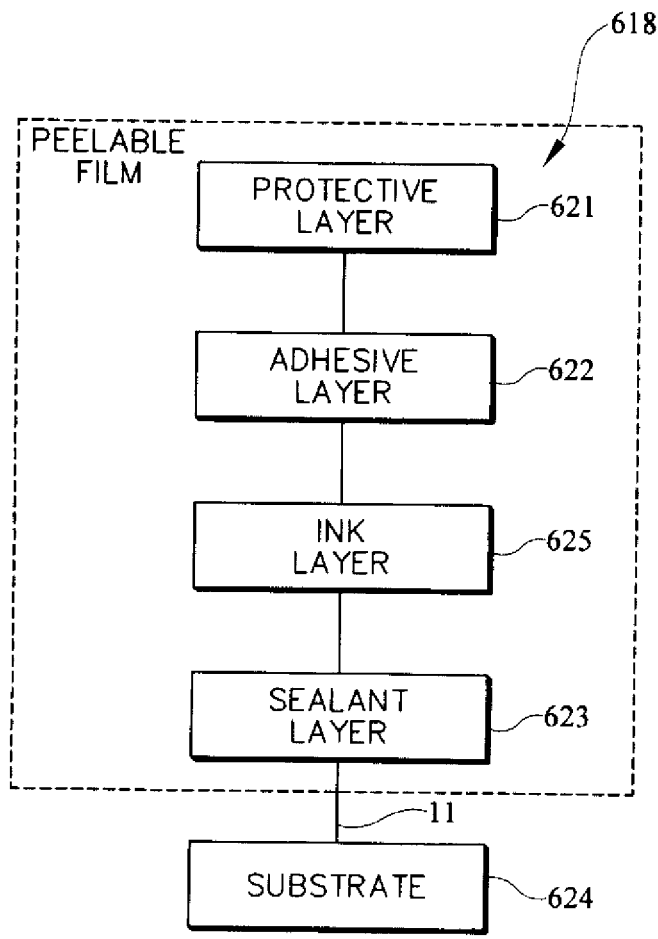
FIG. 11 is a diagrammatic view of an eighth embodiment of a cold-durable, heat-resistant, peelable film showing that the peelable film includes, from top to bottom, a protective layer, an adhesive layer, an ink layer, and a sealant layer.

Another illustrative embodiment of a peelable film 618 in accordance with the present disclosure includes a protective layer 621, an adhesive layer 622, an ink (printed graphic) layer 625, and a monolayer polyolefin sealant layer 623 as shown in FIG. 11. Protective layer 621 is laminated to printed sealant layer 623 by adhesive layer 622. Sealant layer 623 is coupled to a substrate 624 by interface bond 11. Substrate 624 may be a container or a layer of material in a container. In one example, a container may include a tray made of paper and a substrate coupled to the tray to line the tray and couple to peelable film 618 to enclose an interior region defined by the tray and the substrate. In another example, a container may include a tray made of polypropylene that couples to peelable film 618 to enclose an interior region defined by the tray.

Figure 12:
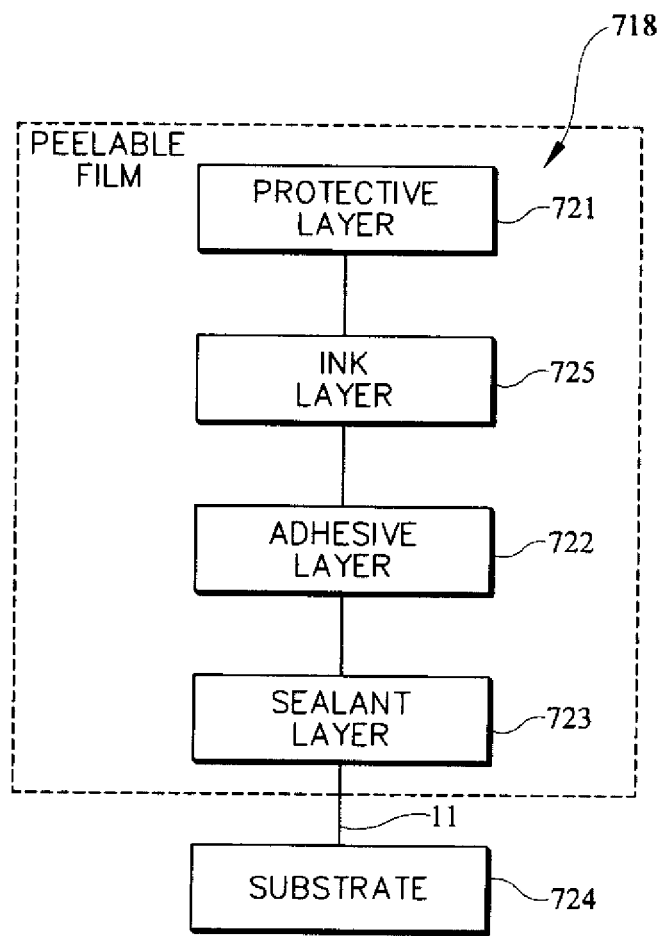
FIG. 12 is a diagrammatic view of an ninth embodiment of a cold-durable, heat-resistant, peelable film showing that the peelable film includes, from top to bottom, a protective layer, an ink layer, an adhesive, and a sealant layer including, in series, an outer skin sub-layer, a core sub-layer, and a heat sealable sub-layer.

Another illustrative embodiment of a peelable film 718 in accordance with the present disclosure includes a protective layer 721, an ink (printed graphic) layer 725, an adhesive layer 722, and a monolayer polyolefin sealant layer 723 as shown in FIG. 12. Printed protective layer 721 is laminated to sealant layer 723 by adhesive layer 722. Sealant layer 723 is coupled to a substrate 724 by interface bond 11. Substrate 724 may be a container or a layer of material in a container. In one example, a container may include a tray made of paper and a substrate coupled to the tray to line the tray and couple to peelable film 718 to enclose an interior region defined by the tray and the substrate. In another example, a container may include a tray made of polypropylene that couples to peelable film 718 to enclose an interior region defined by the tray.

As illustrated in FIGS. 5-9, peelable films 18, 118, 218, 318, and 418 are used to establish a closure in accordance with the present technology that comprises a multilayer polyolefin sealant layer 23, 123, 223, 323, 423 having at least three sub-layers: (a) an heat sealable sub-layer 233, 1233, 2233, 3233, 4233; (b) a core sub-layer 232, 1232, 2232, 3232, 4232 adjacent to heat sealable sub-layer 233, 1233, 2233, 3233, 4233; and (c) an outer skin sub-layer 231, 1231, 2231, 3231, 4231 adjacent to core sub-layer 232, 1232, 2232, 3232, 4232 such that core sub-layer 232, 1232, 2232, 3232, 4232 is sandwiched between heat sealable sub-layer 233, 1233, 2233, 3233, 4233 and outer skin sub-layer 231, 1231, 2231, 3231, 4231. In illustrative embodiments, adhesive layer 22, 122, 222 laminates outer skin sub-layer 231, 1231, 2231 of the multilayer polyolefin sealant layer 23, 123, 223 to protective layer 21, 121, 221 to form cold-durable, heat-resistant, peelable film 18, 118, 218 that has a thickness of about 1 mil to about 10 mil. In other illustrative embodiments, multilayer polyolefin sealant layer 323, 423 serves as a cold-durable, heat-resistant, peelable film 318, 418 where the protective layer is included as part of the sealant layer, i.e., as outer skin sub-layer 3231, 4231.

Heat sealable sub-layer 233, 1233, 2233, 3233, 4233 of the multilayer polyolefin sealant layer 23, 123, 223, 323, 423 is formed from at least one thermoplastic polymer that is capable of heat sealing to itself or to another film layer. In order to make a film suitable for use as packaging for both freezer storage and microwave heating, the inner heat sealable sub-layer of the multilayer film should meet the following requirements: (1) it should have a low heat seal initiation temperature in order to be able to form adequate heat seals on standard packaging machines or form-fill-seal machines (either vertical or horizontal); (2) it should maintain its strength, i.e., not fracture, and have good ductility in subzero freezer temperatures (about −20° C. to about 0° C.); (3) it should be able to maintain sufficient heat seal or control at microwave temperatures (about 71° C. to about 105° C.) without losing control of steam pressure generation, bursting or leaking; and (4) it should peel easily either before or after microwave cooking, or other cooking, with sideways pulling force Fsp of about 1 lbf/in to about 5 lbf/in. As another example, sideways pulling force Fsp may be about 1 lbf/in to about 3 lbf/in.

Suitable materials for forming heat sealable sub-layer 233, 1233, 2233, 3233, 4233 of multilayer polyolefin sealant layers 23, 123, 223, 323, 423 of the present disclosure include, but are not limited to, those that have a seal initiation temperature within the range of from about 105° C. to about 135° C., and melting points within the range of from about 105° C. to about 150° C. As an example, heat sealable sub-layer 233, 1233, 2233, 3233, 4233 is formed from at least one propylene/alpha-olefin copolymer. Suitable propylene/alpha-olefin copolymers include propylene/ethylene copolymer, propylene/butene copolymer, propylene/hexene copolymer, propylene/octene copolymer, mixtures thereof, blends thereof, and the like.

As another example, heat sealable sub-layer 233, 1233, 2233, 3233, 4233 is formed from at least one propylene/ethylene copolymer (which may be in a random propylene/alpha-olefin copolymer) and at least one polyethylene resin. The polyethylene resin having a melt index of about 0.50 g/10 min. (measured at 190° C. in accordance with ASTM D1238-04) to about 20 g/10 min. (measured at 190° C. in accordance with ASTM D1238-04).

In yet another example, heat sealable sub-layer 233, 1233, 2233, 3233, 4233 is formed from at least one propylene/ethylene copolymer (which may be in a random propylene/alpha-olefin copolymer) and two different polyethylene resins one of which has a melt index of about 0.50 g/10 min. (measured at 190° C. in accordance with ASTM D1238-04) to about 20 g/10 min. (measured at 190° C. in accordance with ASTM D1238-04). Suitable polyethylene resins for use herein are, for example, ethylene/octene copolymer (a polyethylene resin derivative also known as a polyolefin elastomer), linear low density polyethylene (LLDPE), low density polyethylene (LDPE), high density polyethylene (HDPE), and polyethylene resin derivatives such as ethylene vinyl acetate, ethylene methyl acrylate, and the like. Suitable propylene/ethylene copolymers for use herein are, for example, polypropylene copolymers comprising from about 1% to about 8% by weight of ethylene comonomer and having a melt flow rate from about 0.5 g/10 min. (measured at 230° C. in accordance with ASTM D1238-04) to about 45 g/10 min. (measured at 230° C. in accordance with ASTM D1238-04).

Without wishing to be bound by theory, it is believed that blending propylene/alpha-olefin copolymer resins (e.g., propylene/ethylene copolymer) with one or more polyethylene resins in heat sealable sub-layer 233, 1233, 2233, 3233, 4233 leads to cold-durable, heat-resistant, peelable films 18, 118,

218, 318, 418. The incorporation of ethylene comonomer in the propylene/ethylene copolymer may increase irregularity of the polymer chains which may reduce the crystallinity of the polymer. This may result in a lower seal initiation temperature than if homopolymer polypropylene were used as the heat sealable material, as well as improved ductility at subzero temperatures.

When a frozen, microwaveable packaged food product is cooked in a microwave oven, the steam generated from the food has a temperature close to the boiling point of water, i.e., about 100° C. Under typical microwave cooking conditions, as long as the steam exists in the package, the maximum steam temperature in the package typically remains below 104° C. Polypropylene resins such as Dow H110-02 (melting temperature 161° C.), Dow 6D20 (melting temperature 148° C.), Dow 3000 (melting temperature 108° C.), and Total EOD02 (now Total LX502-15, melting temperature 119° C.), as well as polyethylene terephthalate (PET, melting temperature 230-260° C.) film or polypropylene homopolymer (PP) in an outer protective sub-layer (melting temperature 158-165° C.), each have a melting temperature above 104° C. As such, they can withstand the heat generated during microwave cooking.

Again, without wishing to be bound by theory, steam generated during the course of a microwave cooking cycle is believed to serve the dual purpose of heating a food product and cooling so-called "hot spots" that may develop in the microwaveable package. As stated above, the maximum steam temperature within the package typically remains below 104° C. However, the actual temperature of a food product, in particular those including foods containing, for example, oil(s), sauce(s), sugar(s), starch(es), and the like, may exceed 120° C. (resulting in film scorching and/or film burn-through) if the moisture content of the food product is insufficient to support steam generation that would otherwise provide the aforementioned cooling effect. Thus, the aforementioned exemplary food products are also compatible with the present technology, provided that they maintain a moisture content sufficient for steam generation throughout the microwave cooking cycle.

Dow 8150, Dow 5400G, and Huntsman LD1058 each have a low glass transition temperature (−52° C., <−80° C., and <−80° C., respectively) and thus provide durability in a freezer at subzero temperatures. Dow 5400G and Hunstman LD1058 are polyethylene resins, whereas Dow 8150 is an ethylene-based polyolefin elastomer (i.e., ethylene/octene copolymer). Because of their ethylenic nature, all three of the aforementioned resins have a certain degree of incompatibility with polypropylene resins.

It has been surprisingly found that, under certain heat sealing conditions and/or temperature ranges, the aforementioned incompatibility can be exploited to prepare sealant films that, while maintaining their strength and ductility in subzero freezer temperatures and sufficient heat seal at microwave temperatures, cannot achieve a complete fusion seal with trays or films made from polypropylene resins. Thus, before or after microwaving, the resultant sealant film is easily peelable thereby affording cold-durable, heat-resistant, peelable films 18, 118, 218, 318, 418.

Again, without wishing to be bound by theory, because polypropylene is the major component in heat sealable sub-layer 233, 1233, 2233, 3233, 4233, an extrusion (e.g., melt mixing) process is believed, based on microscopic examination, to create a cold-durable, heat-resistant, peelable film 18, 118, 218, 318, 418 with polyethylene particles dispersed in the continuous phase of a polypropylene matrix. Due to the aforementioned incompatibility, weak Van der Waals forces rather than strong covalent bonding occur between polyethylene particles and the polypropylene matrix in such a film. Upon stretching such a film, separation of polyethylene particles from the polypropylene matrix occurs resulting in many voids (i.e., gaps or holes) in the peelable film being visible under microscopic examination. Thus, after heat sealing, polyethylene particles bonded to the brim of a polypropylene container by similarly weak forces would be separated easily from the polypropylene, thereby enhancing peelability.

Surprisingly, in spite of a tendency for polyethylene particles to separate from a polypropylene matrix, blending in additional polyethylene resin(s) apparently enhances the adhesive and elastic properties of both the polypropylene and polyethylene phases. As a result, in a hot environment, e.g., at temperatures used in conventional residential microwave ovens (about 71° C. to about 105° C.), a sufficient heat seal may be maintained with a cold-durable, heat-resistant, peelable film 18, 118, 218, 318, 418 without bursting or leaking and without losing control of steam pressure generation.

In a cold environment, when an external impact force is applied to a cold-durable, heat-resistant, peelable film 18, 118, 218, 318, 418, undesired processes such as plastic deformation, dislocation gliding, polymer crystal twining, and/or polymer chain extension would normally be expected to occur in the polypropylene matrix. Such processes would be expected to result in the formation of cracks, microvoids, and/or creases around the polyethylene particles. Surprisingly, however, polyethylene particles apparently act as energy sinks or crack stoppers to absorb impact energy and inhibit formation and/or propagation of cracks, microvoids and/or creases. Microvoiding and creasing, as well as cracking, are a consequence of the local stress state around polyethylene particles, and are dependent on the adhesion between the polypropylene matrix and polyethylene particles and the elastic properties of both phases. Blending polypropylene resin(s) with one or more polyethylene resin(s) apparently enhances the adhesive and elastic properties of both the polypropylene and polyethylene phases to create a cold-durable, heat-resistant, peelable film 18, 118, 218, 318, 418 that maintains its strength, i.e., does not fracture, and has good ductility in subzero freezer temperatures (about −20° C. to about 0° C.).

The thickness of heat sealable sub-layer 233, 1233, 2233, 3233, 4233 depends, in part, upon the size of the food package to be made from cold-durable, heat-resistant, peelable film 18, 118, 218, 318, 418 of the present technology. The inner heat sealable sub-layer must be thick enough to form a strong seal that will not fail when exposed to temperatures in a range from about 71° C. to about 105° C., yet not so thick that it negatively affects the manufacture of the sealant layer. In general, the thickness of the heat sealable sub-layer may be in a range from about 0.1 mil to about 3 mils.

Core sub-layer 232, 1232, 2232, 3232, 4232 is adjacent to heat sealable sub-layer 233, 1233, 2233, 3233, 4233. Core sub-layers suitable for use with the present technology are formed from thermoplastic materials that are compatible with the materials selected for the inner heat sealable sub-layer, and that can form a strong adhesive bond with the heat sealable sub-layer in order to prevent delamination of the sub-layers from occurring during freezer storage and microwave cooking. The core sub-layer should also have a melting point well above microwave cooking temperatures (from about 71° C. to about 105° C.) in order to maintain its solid state and strength when the inner heat sealable sub-layer starts to soften in the microwave.

Examples of materials suitable for use in forming the core sub-layer 232, 1232, 2232, 3232, 4232 of the multilayer polyolefin sealant layer 23, 123, 223, 323, 423 of the present disclosure include, but are not limited to, polypropylenes or polyethylene resins, blends thereof or mixtures thereof. For example, one example of a material for the core sub-layer is a homopolymer polypropylene having a melt flow rate of about 0.5 g/10 min. (measured at 230° C. in accordance with ASTM D1238-04) to about 25 g/10 min. (measured at 230° C. in accordance with ASTM D1238-04), and a melting point of about 155° C. to about 165° C. Another example of a material for the core sub-layer is an ethylene/octene copolymer (a polyethylene resin derivative also known as a polyolefin elastomer) having a melt index of about 0.5 g/10 min (measured at 190° C. in accordance with ASTM D1238-04 to about 20 g/10 min. (measured at 190° C. in accordance with ASTM D1238-04). An example of a blend or mixture includes homopolymer polypropylene and ethylene/octene copolymer. In general, the thickness of the core sub-layer may range from about 0.1 mil to about 4 mils.

Outer skin sub-layer 231, 1231, 2231, 3231, 4231 is adjacent to the core sub-layer 232, 1232, 2232, 3232, 4232. Outer skin sub-layers suitable for use with the present technology are formed from at least one thermoplastic material, and are formed form a blend of thermoplastic materials. Examples of materials suitable for use in forming the outer skin sub-layer 231, 1231, 2231, 3231, 4231 of the multilayer polyolefin sealant layer 23, 123, 223, 323, 423 of the present disclosure include, but are not limited to, polypropylene or polyethylene resins, blends thereof or mixtures thereof. For example, one material for the outer skin sub-layer is a homopolymer polypropylene having a melt flow rate of about 0.5 g/10 min. (measured at 230° C. in accordance with ASTM D1238-04) to about 25 g/10 min. (measured at 230° C. in accordance with ASTM D1238-04), and a melting point of about 155° C. to about 165° C. Another material for the outer skin sub-layer is an ethylene/octene copolymer (a polyethylene resin derivative also known as a polyolefin elastomer) having a melt index of about 0.5 g/10 min (measured at 190° C. in accordance with ASTM D1238-04 to about 20 g/10 min. (measured at 190° C. in accordance with ASTM D1238-04). An example of a blend or mixture includes homopolymer polypropylene and ethylene/octene copolymer. In general, the thickness of the outer skin sub-layer may range from about 0.1 mil to about 4 mils.

Multilayer polyolefin sealant layers of the present technology may be manufactured using a variety of known film processing techniques (e.g., coextrusion, lamination, and the like). For example, a multilayer polyolefin sealant layer of the present technology can be made via a blown film coextrusion process. In such an embodiment, the multilayer sealant layer is formed using a blown film apparatus composed of a multi-manifold circular die head having concentric circular orifices. The multilayer sealant layer is formed by coextruding a molten layer through a circular die, and a molten layer on the other or each opposite side of the first layer through additional circular dies concentric with the first circular die. Next, a gas, typically air, is blown through a jet that is concentric with the circular dies, thereby forming a bubble that expands the individual layers. The bubble is collapsed onto itself to form a pair of multilayer films attached at two opposite edges. Usually, the pair of attached multilayer films are then cut apart at one or more edges and separated into a pair of multilayer films that can be rolled up.

Alternatively, multilayer polyolefin sealant layers of the present technology can be manufactured using other extrusion processes known in the art, such as a cast film process, wherein melted and plasticized streams of individual layer materials are fed into a coextrusion die, such as a multi-manifold die. Upon emersion from the die, the layers are quenched to form a single multilayer film of polymeric material. Multilayer polyolefin sealant films of the present technology can also be manufactured by a lamination process, in which each layer of the film is formed separately, and the layers are then laminated together to arrive at the polyolefin film.

As illustrated in FIGS. 10-12, a cold-durable, heat-resistant, peelable film 518, 618, 718 is used to establish a closure in accordance with the present technology that comprises a monolayer polyolefin sealant layer 523, 623, 723. In illustrative embodiments, protective layer 521, 621, 721 is laminated to sealant layer 523, 623, 723 by adhesive layer 522, 622, 722 to cold-durable, heat-resistant, peelable film 518, 618, 718 that has a thickness of about 0.5 mil to about 6 mil.

A monolayer polyolefin sealant layer 523, 623, 723 for use with the present technology is formed from at least one thermoplastic polymer that is capable of sealing to itself or to another film layer. In order to make a layer suitable for use as packaging for both freezer storage and microwave heating, the monolayer sealant layer preferably should meet the following requirements: (1) it should have a low heat seal initiation temperature in order to be able to form adequate heat seals on standard packaging machines or form-fill-seal machines (either vertical or horizontal); (2) it should maintain its strength, i.e., not fracture, and have good ductility in sub-zero freezer temperatures (about −20° C. to about 0° C.); (3) it should be able to maintain sufficient heat seal or control at microwave temperatures (about 71° C. to about 105° C.) without losing control of steam pressure generation, bursting or leaking; and (4) it should peel easily either before or after microwave cooking with sideways pulling force Fsp of about 1 lbf/in to about 5 lbf/in. As another example, sideways pulling force Fsp may be about 1 lbf/in to about 3 lbf/in.

Suitable materials for forming the monolayer polyolefin sealant layer 523, 623, 723 of cold-durable, heat-resistant, peelable film 518, 618, 718 of the present disclosure are those that have a seal initiation temperature within the range of from about 105° C. to about 135° C., and melting points within the range of from about 105° C. to about 150° C. As an example, the monolayer polyolefin sealant film is formed from at least one propylene/alpha-olefin copolymer. Suitable propylene/alpha-olefin copolymers include, but are not limited to, propylene/ethylene copolymer, propylene/butene copolymer, propylene/hexene copolymer, propylene/octene copolymer, mixtures thereof, blends thereof, and the like. As another example, the monolayer polyolefin sealant film is formed from a propylene/alpha-olefin copolymer (which may be a random copolymer) and at least one polyethylene resin, where the polyethylene resin includes, but is not limited to, low density polyethylene (LDPE), linear low density polyethylene (LLDPE), high density polyethylene (HDPE), ethylene vinyl acetate (EVA), ethylene methyl acrylate, and the like. In yet another example, the monolayer polyolefin sealant film is formed from a propylene/alpha-olefin random copolymer having a melt flow rate of about 0.5 g/10 min. (measured at 230° C. in accordance with ASTM D1238-04) to about 45 g/10 min. (measured at 230° C. in accordance with ASTM D1238-04), an isotactic propylene copolymer, and low density polyethylene (LDPE).

Typically, polyethylene resins are incompatible with polypropylene copolymers and do not blend effectively. In the course of developing the present peelable film, a factor considered was to develop a system which would have limited strength adhesion to containers made from polypropylene (or similar) materials. Surprisingly, it was found in the course of developing the present peelable film that blending propylene/ alpha-olefin copolymers with one or more polyethylene resins in the monolayer polyolefin sealant layer 523, 623, 723 unexpectedly led to sealant films that, while maintaining their strength and ductility in subzero freezer temperatures and maintaining sufficient heat seal at microwave temperatures, do not achieve a complete or permanent fusion seal with containers or films made from polypropylene resins. Thus, before or after microwaving, the resultant sealant film is easily peelable thereby affording cold-durable, heat-resistant, peelable films 518, 618, 718. The theoretical considerations put forth above for multilayer peelable film compositions are believed to be equally applicable to monolayer peelable film compositions.

Monolayer polyolefin sealant films of the present technology can also be manufactured using a variety of known film processing techniques, e.g., by monolayer film, coextrusion blown film, and cast film processes, or other techniques known to those skilled in the art. In the coextrusion process, each layer uses the same resin blend such that the finished product is still considered a monolayer.

As illustrated in FIGS. 5-9, peelable films 18, 118, 218, 318, 418 are used to establish a closure, i.e., a cold-durable, heat-resistant, peelable film, in accordance with the present technology. Peelable films 18, 118, 218, 318, 418 may include an adhesive layer 22, 122, 222 which bonds protective layer 21, 121, 221 to outer skin sub-layers 231, 1231, 2231 of multilayer polyolefin sealant layer 23, 123, 223.

Likewise, as illustrated in FIGS. 10-12, peelable films 518, 618, 718 are used to establish a closure, i.e., a cold-durable, heat-resistant, peelable film, in accordance with the present technology. Peelable films 518, 618, 718 may comprise an adhesive layer 522, 622, 722 which bonds protective layer 521, 621, 721 to monolayer polyolefin sealant layer 523, 623, 723. Suitable adhesives for use herein are those that can maintain their adhesive strength at temperatures above about 100° C. and that are used to bond dissimilar materials together. Examples of suitable adhesive materials for use herein include, but are not limited to, polyurethanes, epoxides, hot-melts of ethylene vinyl acetate, hot melts of polyamide, hot-melts of polyester, combinations thereof, blends thereof, and the like. Suitable polyurethane adhesives are available, for example, Dow Chemical, in Houston, Tex., as catalog number L75-164/C-411; from Dow Chemical, in Houston, Tex., under trade name MOR-FREE™, from Henkel Corporation, in Cary, N.C., under trade name Tycel™ and Liofol™, and from Sovereign Specialty Chemicals, in Buffalo, N.Y., under the trade name Primabond™. One suitable hot melts of vinyl acetate are available, for example, H.B. Fuller in St. Paul, Minn. under the trade name Flextra®.

The adhesive may be applied to outer skin sub-layer 231, 1231, 2231 of multilayer polyolefin sealant layer 23, 123, 223, protective layer 21, 121, 221, or both, using any acceptable technique. Likewise, the adhesive may be applied to monolayer polyolefin sealant layer 523, 623, 723, protective layer 521, 621, 721, or both utilizing any acceptable technique. For example, a lamination coater may be used to apply the adhesive.

Alternatively, solvent based, solventless, or water-based adhesive lamination equipment may be used for laminating protective layer 21, 121, 221 to outer skin sub-layer 231, 1231, 2231 of multilayer polyolefin sealant layer 23, 123, 223 or the protective layer 521, 621, 721 to monolayer polyolefin sealant layer 523, 623, 723. The adhesive is applied in an amount sufficient to bond protective layer 21, 121, 221 to outer skin sub-layer 231, 1231, 2231 of the multilayer polyolefin sealant layer 23, 123, 223 or to bond protective layer 521, 621, 721 to monolayer polyolefin sealant layer 523, 623, 723. In general, the thickness of adhesive layer 22, 122, 222, 522, 622, 722 will typically be in the range of about 0.01 mil to about 0.5 mil, or more preferably from about 0.02 mil to about 0.2 mil.

In some alternative embodiments, cold-durable, heat-resistant, peelable films of the present technology do not have adhesive layer 22, 122, 222, 522, 622, 722. In such embodiments, non-adhesive bonding techniques known in the art may be used to bond protective layer 21, 121, 221 to outer skin sub-layer 231, 1231, 2231 of multilayer polyolefin sealant layer 23, 123, 223 or to bond protective layer 521, 621, 721 to the monolayer polyolefin sealant layer 523, 623, 723. For example, but not as a limitation, ultrasonic welding, heat bonding, adhesives, mixtures of adhesives, two-component adhesive systems (such as, but not limited to, epoxy-type activated adhesives), UV curable adhesives or the like may be used to bond protective layer 21, 121, 221 to outer skin sub-layer 231, 1231, 2231 of the multilayer polyolefin sealant layer 23, 123, 223 or to bond the protective layer 521, 621, 721 to the monolayer polyolefin sealant layer 523, 623, 723.

Protective layer 21, 121, 221, 521, 621, 721 bonded to polyolefin sealant layer 23, 123, 223, 523, 623, 723 provides strength, stiffness, and a glossy surface to resulting polyolefin films. If a printed image is applied to outer skin sub-layer 1231 of the multilayer polyolefin sealant layer 123 or to monolayer polyolefin sealant layer 623, protective layer 121, 621 also protects the printed image from heat distortion and degradation. Suitable materials for forming the outer protective layer are those materials that have a high temperature resistance, such as, for example, polyethylene terephthalate (PET) and polyamides, including polyamide 6 and polyamide 6.6 (nylon). Also, oriented films, such as biaxially oriented polypropylene films, or a biaxially oriented propylene/ethylene copolymer films can be used for forming the outer protective layer. The outer protective layer may have a thickness ranging from about 0.1 mil to about 3.0 mil, preferably ranging from about 0.38 mil to about 1.0 mil.

Package 10, as shown in FIGS. 1-3 and 13-16, includes hermetic steam-venting system 16 that is formed in closure 14. As an example, hermetic steam-venting system 16 is configured to provide means for controlling pressure P and temperature T in interior product-storage region 32 during heating of package 10 to cause steam to be generated in interior product-storage region 32 and conducted through closure 14 so that food 35 stored in interior product-storage region 32 is heated uniformly throughout while minimizing upward pulling force Fup so that closure 14 does not separate from brim 30 during heating.

Hermetic steam-venting system 16 includes a series of spaced-apart bore holes 50 and an elongated bore slot 52 as shown in the embodiments illustrated in FIGS. 13-16. As one illustrative example, a first set of bore holes 50 is located near one end of package 10 and a second set of bore holes 50 is located near an opposite end of package 10. Elongated bore slot 52 is arranged to extend between the first and second sets of bore holes. First and second sets of bore holes 50 cooperate with elongated bore slot 52 to help open elongated bore slot 52 easily and properly during microwave cooking. First and second sets of bore slots 50 cooperate with elongated bore slot 52 to maximize cold temperature durability.

Each bore hole 50 includes a series of bore-hole passageways 541, 542, 543, 544 and a bore-hole floor 56 as shown in FIG. 14. Bore-hole passageways 541, 542, 543, 544 are aligned in series as shown in FIG. 14. Bore-hole floor 56 blocks free movement of steam 42 formed in interior product-storage region 32 until sufficient pressure is generated in interior product-storage region 32 to rupture bore-hole floor

56. Once bore-hole floor 56 tears, perforates, cracks, ruptures, or otherwise opens to cause another steam passageway 545 to be created, steam 42 moves in order through bore-hole passageways 544, 543, 542, 541, and into atmosphere surrounding package 10 as shown in FIG. 16.

First bore-hole passageway 541 is illustratively formed in protective layer 21 of closure 14. Second bore-hole passageway 542 is formed in adhesive layer 22. Third bore-hole passageway 543 is formed in outer skin sub-layer 231 of sealant layer 23. Fourth bore-hole passageway is formed in core sub-layer 232 of sealant layer 23. Bore-hole floor 56 is formed in core sub-layer 232 and includes a portion of core sub layer 232 and heat sealable sub-layer 233 as shown in FIG. 14.

Elongated bore slot 52 includes a series of bore-slot passageways 581, 582, 583, 584 and a bore-slot floor 60 as shown in FIG. 14. Bore-slot floor 60 blocks free movement of steam 42 formed in interior product-storage region 32 until sufficient pressure is generated in interior product-storage region 32 to rupture bore-slot floor 60. Once bore-slot floor 60 has rupture, steam 42 moves through the bore-slot passageways 584, 583, 582, 581, and into atmosphere surrounding package 10 as shown in FIG. 16.

First bore-slot passageway 581 is illustratively formed in protective layer 21 of closure 14. Second bore-slot passageway 582 is formed in adhesive layer 22. Third bore-slot passageway 583 is formed in outer skin sub-layer 231 of sealant layer 23. Fourth bore-slot passageway 584 is formed in core sub-layer 232 of sealant layer 23. Bore-slot floor 60 is formed in core sub-layer 232 and includes a portion of core sub-layer 232 and heat sealable sub-layer 233 as shown in FIG. 14.

As an example, bore holes 50 and bore slot 52 (sometimes referred to herein as apertures) are both formed in peelable film 18 prior to forming closure 14. Bore holes 50 and bore slot 52 may be formed, in one illustrative embodiment, by a laser removing material in peelable film 18. Alternatively, the apertures may be formed by mechanical means. However, any other suitable device may be used to form bore holes 50 and bore slot 52.

Figure 17:
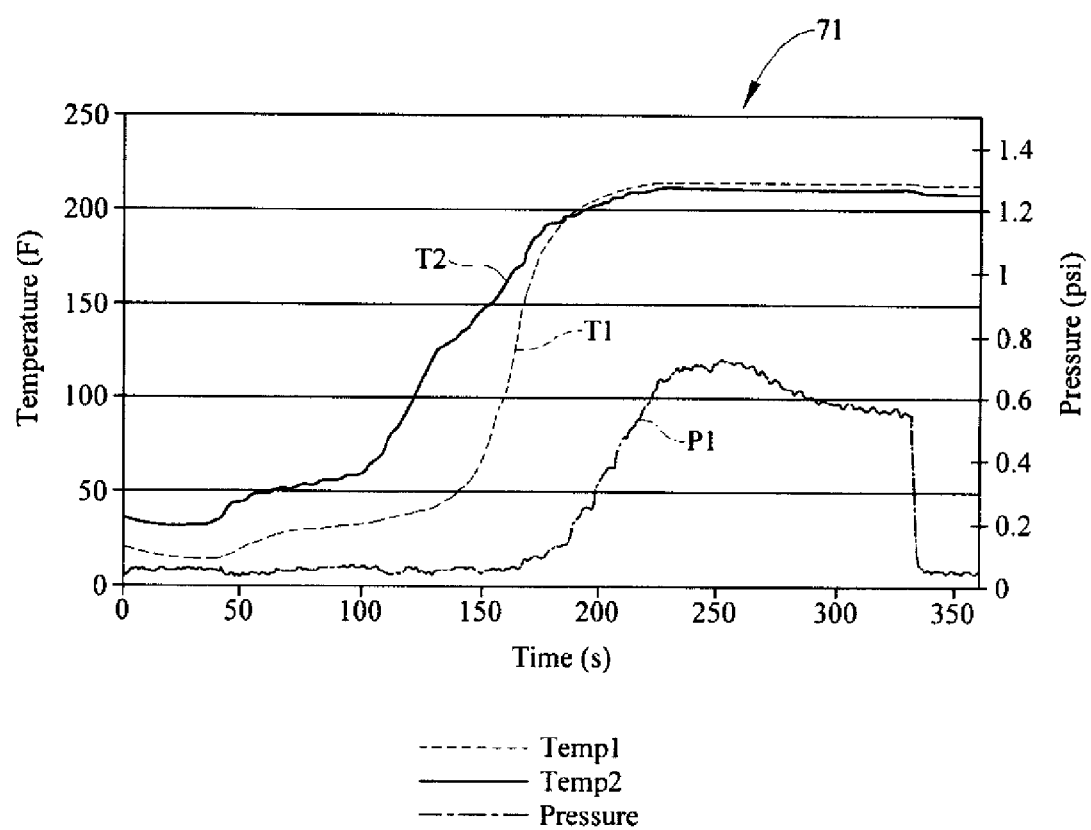
FIG. 17 is a graph showing how pressure and temperature change during heating of a package including a closure made from a cold-durable, heat-resistant, peelable film that includes the sealant layer of Example 1 and one embodiment of a hermetic steam-venting system.
Figure 22:
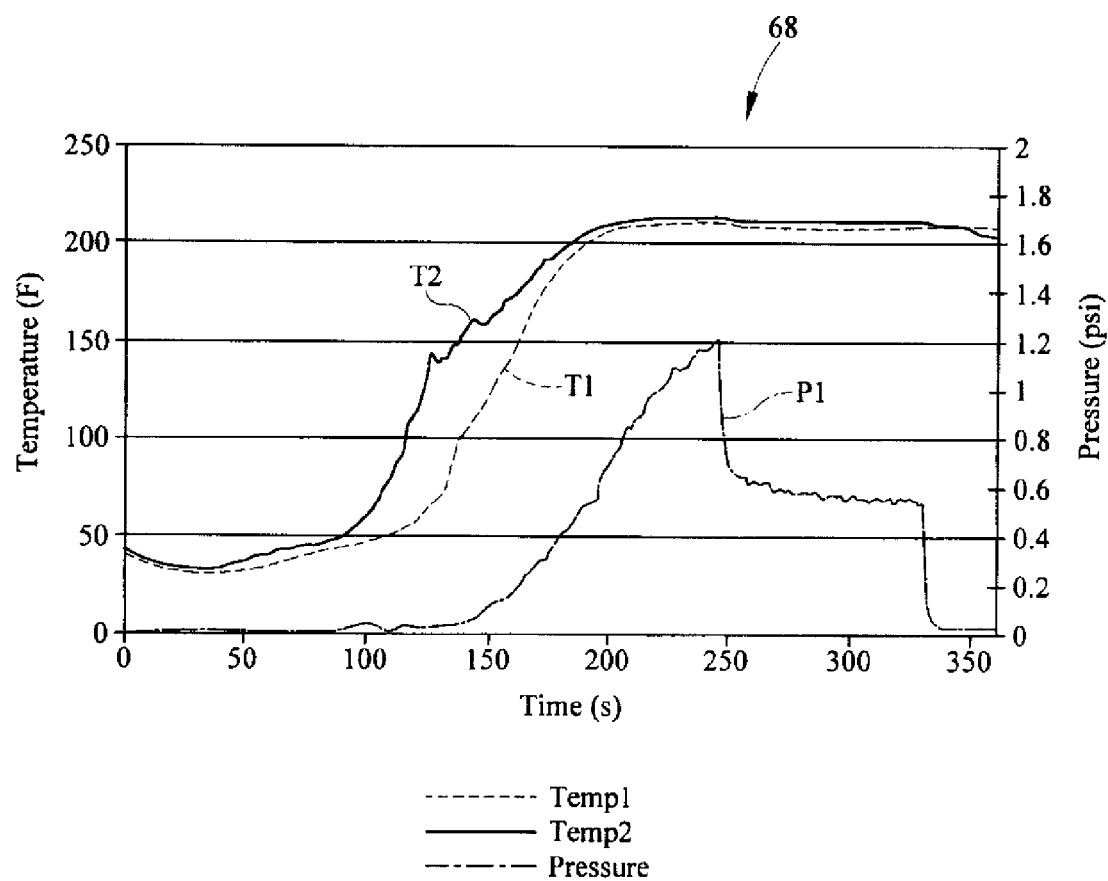
FIG. 22 is a graph showing how pressure and temperature change during heating of a package that includes a closure made from a cold-durable, heat-resistant, peelable film including the sealant layer of Comparative Example 1 and one embodiment of an opened steam-venting system.

During an initial stage of heating, heat 40 is applied to package 10 causing the temperature in interior product-storage region 32 to increase as represented by thermometer bar 37 as shown in FIG. 13. Heating causes steam 42 to be created as temperature and pressure in interior product-storage region 32 increase as shown in FIG. 17. Steam 42 presses on heat sealable sub-layer 233 as shown in FIG. 14. As heating continues, steam 42 continues to build in interior product-storage region 32 until bore-hole floor 56 and bore-slot floor 60 rupture allowing steam 42 to move through bore-hole passageways 544, 543, 542, 541, and bore-slot passageways 584, 583, 582, 581, and into atmosphere surrounding package 10 as shown in FIG. 16. As a result, pressure and temperature in interior product-storage region 32 are controlled so that food 35 is heated uniformly throughout and upward pulling force Fup is optimized so that closure 14 remains coupled to brim 30 of container 12.

As an example, a graph 71 showing heating of a package including an embodiment of a hermetic steam-venting system is shown in FIG. 17. Graph 71 shows how a first temperature T1, a second temperature T2, and a pressure P1 in an interior region of the package changes during heating. As can be seen in FIG. 17, the hermetic steam-venting system allows temperatures and pressures in the interior region to increase until steam is generated, bore-hole floors and bore-slot floors are ruptured. Once the floors are ruptured, steam is conducted through bore-hole passageways and bore-slot passageways so that pressure is controlled and temperatures and pressure remain generally stable as heating continues. As a result, hermetic steam-venting systems also minimize upward pulling force Fup acting on the closure to lift off of the closure from the brim of the container during heating.

As another example, package 100 includes a steam-venting system 116 that is formed in closure 114 as shown in FIGS. 18-21. As an example, steam-venting system 116 is an opened steam-venting system 116 that is configured to provide means for controlling pressure P and temperature T in interior product-storage region 32 during heating of package 10 to cause steam to be generated in interior product-storage region 32 and conducted through closure 114 so that food 35 stored in interior product-storage region 32 is heated uniformly throughout and upward pulling force Fup is optimized so that closure 14 remains coupled to brim 30 of container 12 throughout heating of package 10 as suggested in FIGS. 22 and 23.

Opened steam-venting system 116 includes a series of spaced-apart apertures or slits 150 as shown in FIGS. 18-21. As an example, a first set 150A of slits 150 (see FIGS. 18 and 20) are located along one side of package 100 and aligned along a line generally parallel to a long side of container 12. A second set 150B of slits 150 are located along an opposite side of package 100 and aligned along a second line generally parallel to the first line. Illustratively, each slit 150 included in first set 150A is spaced apart from its neighboring slit 150 a first distance 62 as shown in FIG. 18. Each slit 150 included in second set 150B is spaced apart from its neighboring slit 150 by a relatively smaller second distance 64 as shown FIG. 18.

Each slit includes a series of slit passageways 1541, 1542, 1543, 1544, 1545 that are interconnected to allow steam 42 to travel freely from interior product-storage region 32 through slit passageways 1545, 1544, 1543, 1542, 1541, and into atmosphere surrounding package 100. As an illustrative example, first slit passageway 1541 is illustratively formed in protective layer 121 of closure 114. As an illustrative example, second slit passageway 1542 is formed in adhesive layer 122. As an illustrative example, third slit passageway 1543 is formed in outer skin sub-layer 1231 of sealant layer 123. As an illustrative example, fourth slit passageway 1544 is formed in core sub-layer 1232 of sealant layer 123. As an illustrative example, fifth slit passageway 1545 is formed in heat sealable sub-layer 1233. As a result, interior product-storage region 32 is continuously open to atmosphere by way of slit passageways 1545, 1544, 1543, 1542, 1541.

During an initial stage of heating, heat 40 is applied to package 100 causing the temperature in interior product-storage region 32 to increase as measured by thermometer bar 37 as shown in FIG. 18. Heating causes steam 42 to be created as temperature and pressure in interior product-storage region 32 increases as shown in FIGS. 18 and 20. Steam 42 presses on heat sealable sub-layer 233 as shown in FIG. 19 and moves through slit passageways 1545, 1544, 1543, 1542, 1541. As heating continues, steam 42 continues to build in interior product-storage region 32 while also venting at an increased rate through slit passageways 1545, 1544, 1543, 1542, 1541 into atmosphere surrounding package 100 as shown in FIG. 21. As a result, pressure and temperature in interior product-storage region 32 are controlled so that food 35 is heated uniformly throughout and upward pulling force Fup is optimized so that closure 114 remains coupled to brim 30 of container 12.

As an example, slits 150 are formed in peelable film 118 prior to forming closure 114. In one exemplary embodiment slits 150 are formed by a razor or knife blade piercing peelable film 118. However, any other suitable device may be used.

Figure 23:
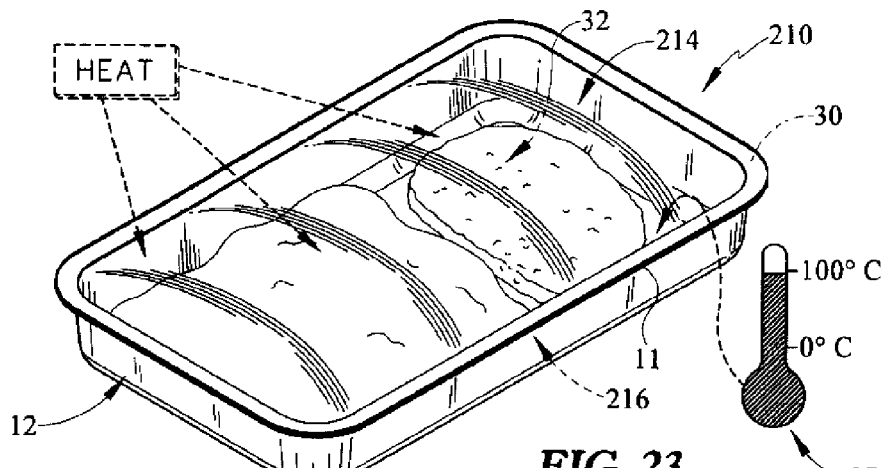
FIGS. 23-26 are a series of views showing use of another embodiment of a hermetic steam-venting system that is formed during heating of a package as steam is generated in an interior region of a container.

As an example of one embodiment of an opened steam-venting system in use, a graph 68 showing heating of a package including another embodiment of an opened steam-venting system is shown in FIG. 23. Graph 68 shows how a first temperature T1, a second temperature T2, and a pressure P1 in an interior region of the package changes during heating. As can be seen in FIG. 23, the opened steam-venting system allows temperatures and pressures in the interior region to increase until steam is generated and conducted through slits formed in a closure included in the package. Once steam begins to move through the slits, pressure is controlled so that temperatures remain generally stable as heating continues. As a result, opened steam-venting systems also optimize upward pulling forces Fup acting to lift off of the closure from the brim of the container during heating.

In another embodiment of an opened steam-venting system, a series of spaced-apart slits may be arranged in various patterns. In one example, each slit is arranged to lie to cause an angle to be formed between the slit and a long side of the container. In another example, the slits may be arranged into rows and columns where each slit is spaced-apart from every other slit. The various examples of arrangements of slits may be changes so long as steam pressure in the interior product-storage region of the container is controlled during heating of the package.

Figure 24:
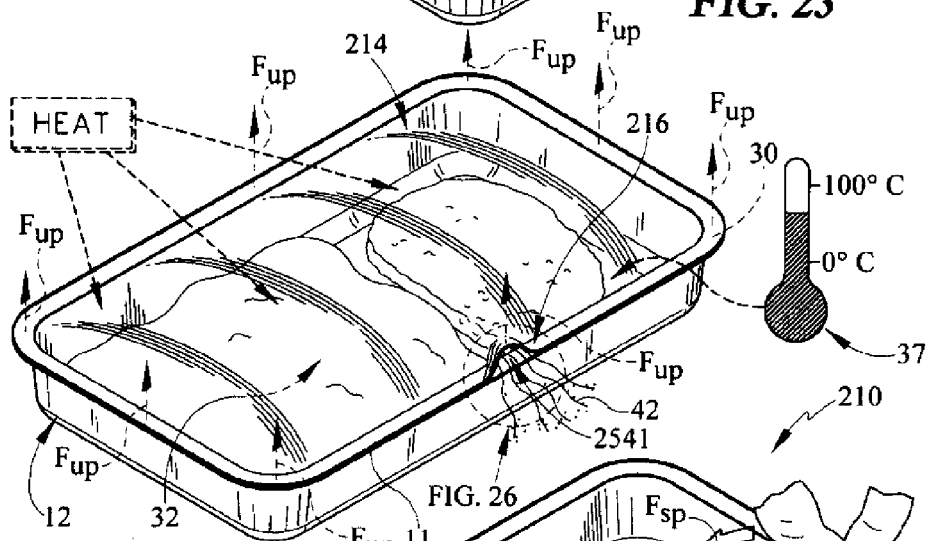
Figure 25:
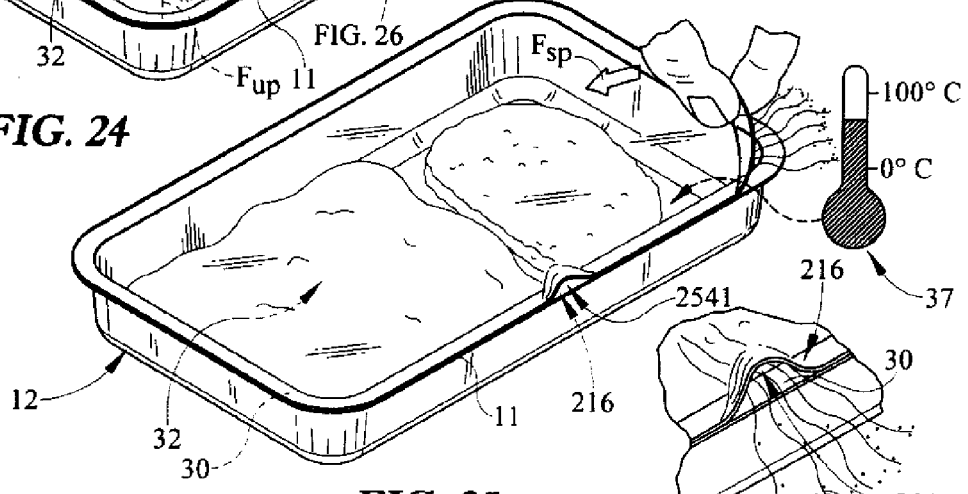
Figure 27:
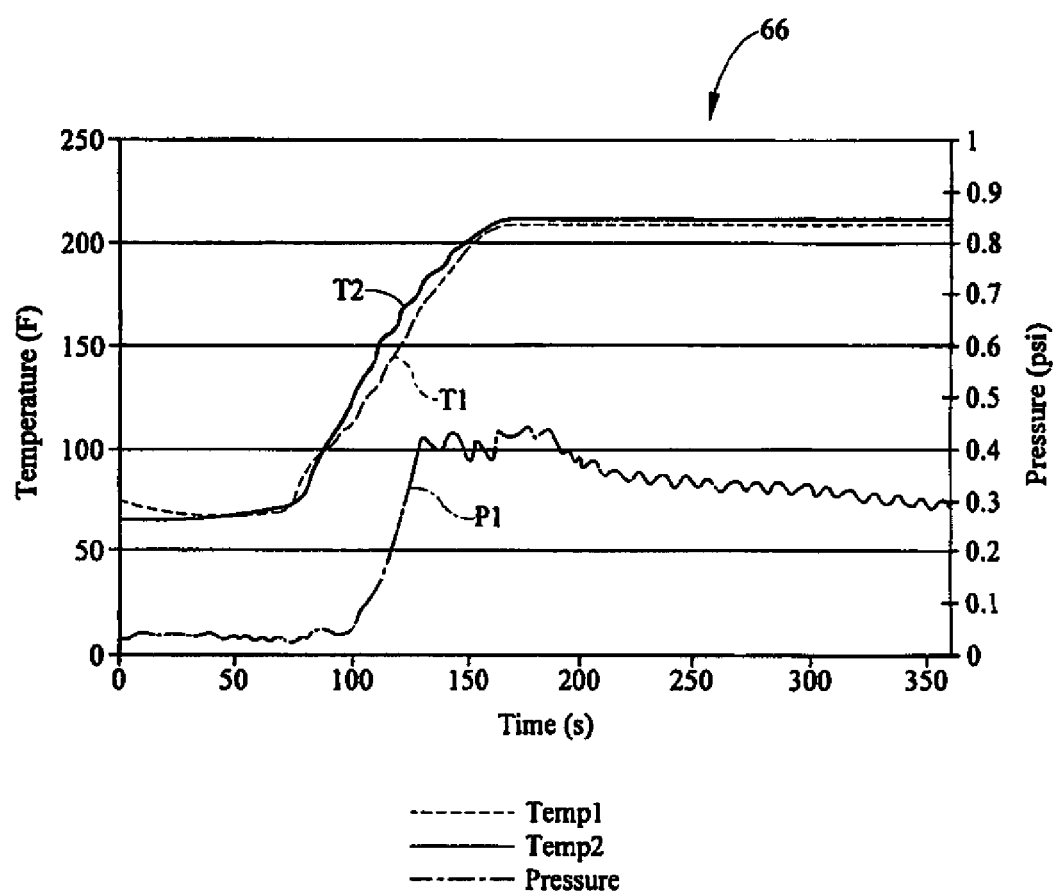
FIG. 27 is a graph showing how pressure and temperature change during heating of a package that includes a closure made from a cold-durable, heat-resistant, peelable film including the sealant layer of Comparative Example 1 and another embodiment of the hermetic steam-venting system of FIG. 25.

As another exemplary embodiment, a package 210 includes a steam-venting system 216 that forms during heating of package 210 as shown in FIGS. 23-25. As an example, steam-venting system 216 forms in package 210 as steam pressure applies a sufficient Fup to a closure 214 included in package 210 to separate closure 214 from a brim 30 included in container 12. As a result, steam pressure and steam temperature in interior region 32 is controlled throughout the heating process as shown in FIG. 27.

Figure 26:
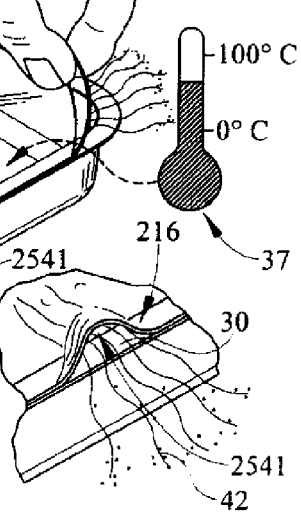

As shown in FIGS. 24-26, steam-venting system 216 is a self-venting system 216 that is configured to provide means for controlling pressure P and temperature T in interior product-storage region 32 during heating of package 210 to cause steam to be generated in interior product-storage region 32 and conducted between closure 214 and container 12 so that package contents stored in interior product-storage region 32 is heated uniformly throughout and upward pulling force Fup is optimized so that a steam passageway 2541 is formed between closure 214 and container 12.

As discussed previously, closure 214 is coupled to a substrate included in container 12 by a bonding interface 11. During heating, upward pulling force Fup provided by steam pressure operates to overcome bonding interface 11 so that a portion of closure 214 separates from brim 30 and steam passageway 2541 is established. Thus, steam-venting system 216 is different from steam-venting systems 16, 116 in that steam-venting system 216 is not formed in the closure, but formed instead between the closure and the container.

As an example of an embodiment of self-venting system in use, FIGS. 24-26 show a graph 66 of heating of a package including the self-venting system. Graph 66 shows how a first temperature T1, a second temperature T2, and a pressure P1 in an interior region of the package changes during heating. As can be seen in FIG. 27, the self-venting system allows temperatures and pressures in the interior region to increase until steam is generated and conducted through the steam passageway formed between the closure and the brim of the container. Once steam begins to move through the steam passageway, pressure is controlled so that temperatures remain generally stable as heating continues.

Figure 28:
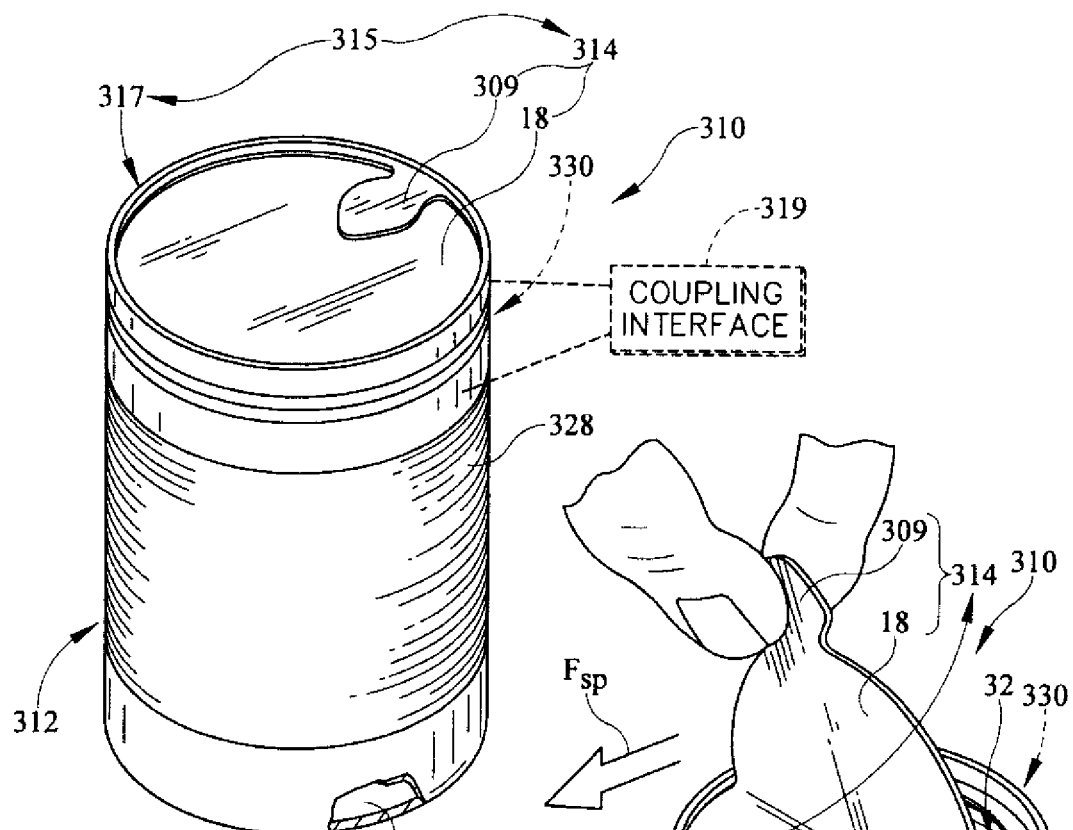
FIGS. 28-31 are a series of views showing another embodiment of a package that includes a container and a lid including a closure made from a cold-durable, heat-resistant, peelable film that is coupled to the container to enclose an interior region formed in the container.
Figure 29:
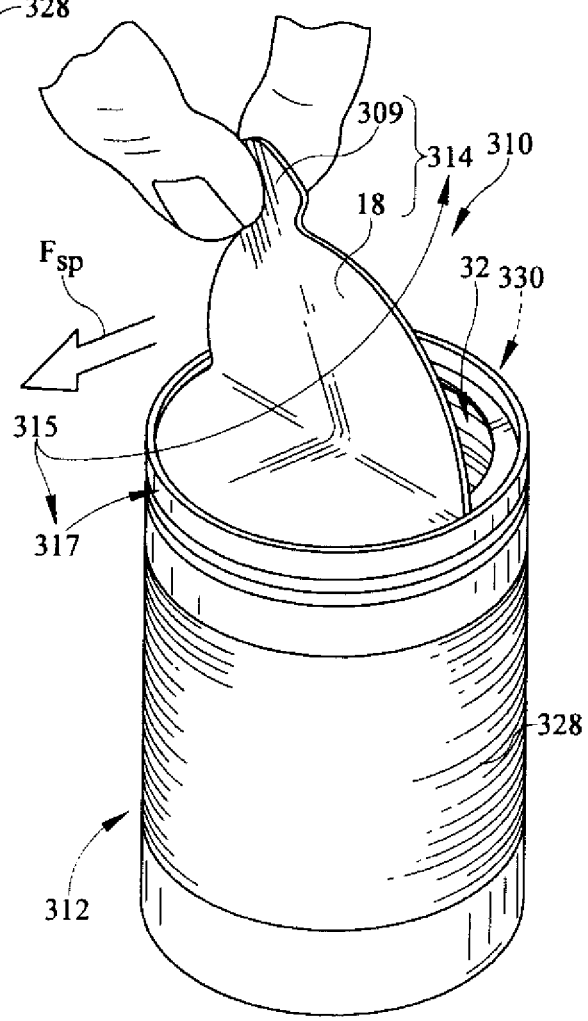
Figure 30:
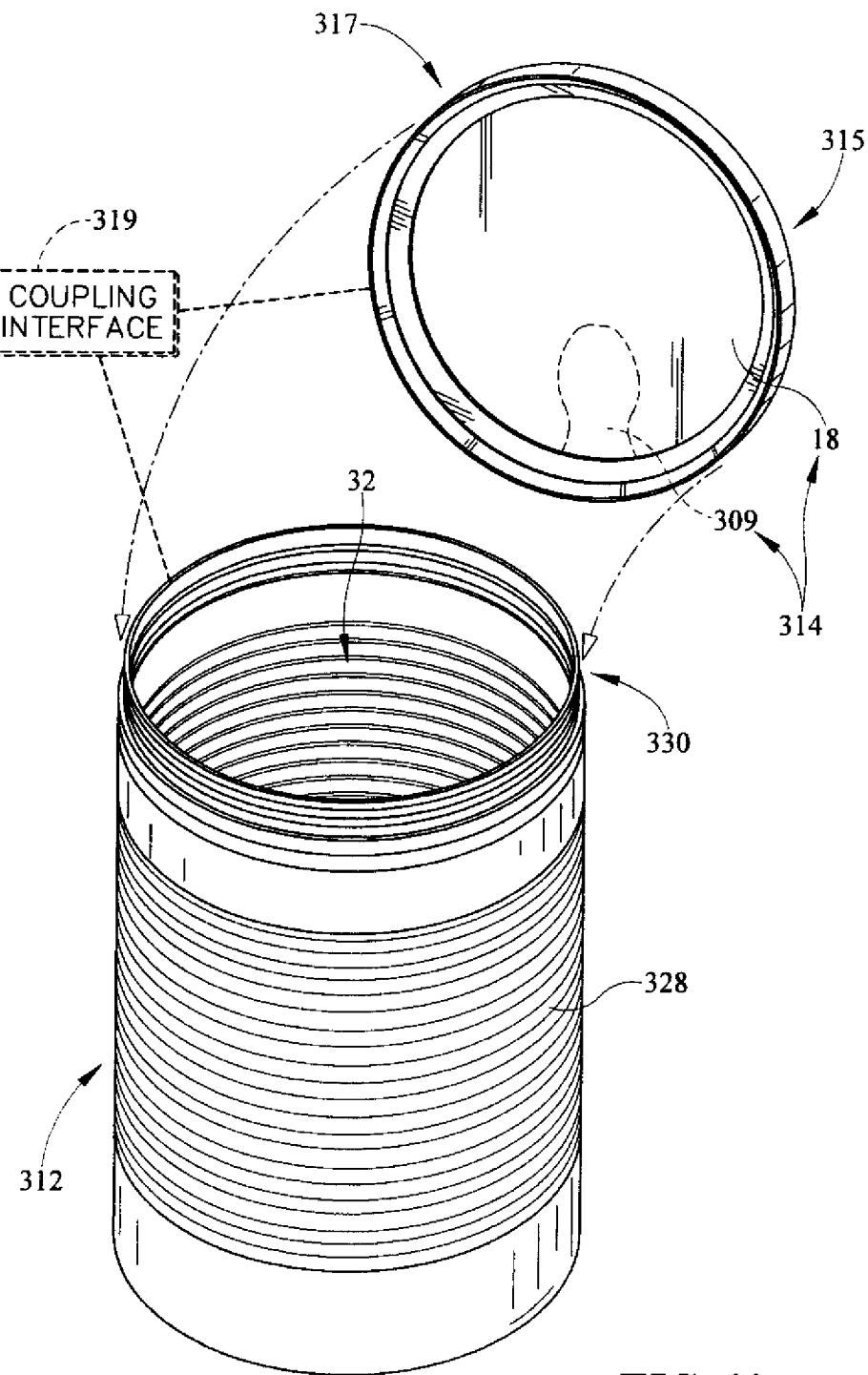
Figure 31:
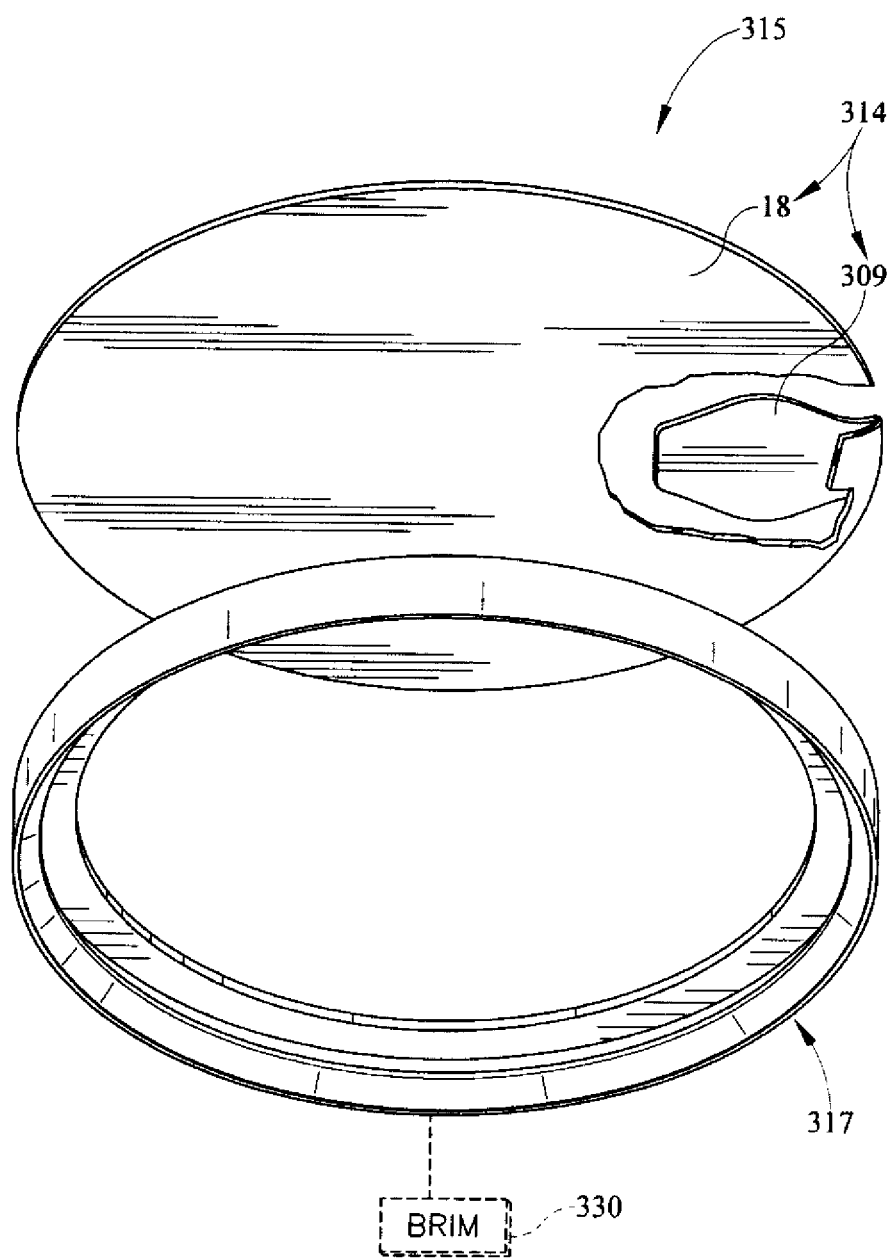

In another exemplary embodiment, a package 310 illustratively includes a container 312 and a separate lid 315 as shown in FIGS. 28-30. Lid 315 includes, for example, a closure 314 and a rim 317 as shown in FIGS. 30 and 31. Closure 314 is formed from a cold-durable, heat-resistant, peelable film 18, 118, 218, 318, 418, 518, 618, 718 and coupled to rim 317. As an example, closure 314 may further be formed to include a pull tab 309 which is helpful in applying sideways pulling force Fsp to open package 310 and gain access to interior product-storage region 32 as shown in FIG. 2.

Container 312 includes a floor 326, a side wall 328 coupled to floor 326 to extend upwardly therefrom, and a brim 330 coupled to side wall 328 to define a mount opening into interior region 32 as shown in FIG. 30. As shown in FIGS. 28 and 30, lid 315 is coupled to brim 330 by a coupling interface 319. As shown in FIG. 30, coupling interface 319 is a snap-fit connection in which rim 317 snaps into mating contact with brim 330 as shown in FIGS. 1 and 2. However, coupling interface 319 may also be an adhesive, a heat seal, a screw, snap, friction fit or other mechanical-type connection, a ring or other interface which is tightened to couple the lid to the brim of the container.

In an example of use, closure 314 and rim 317 may be manufactured together to establish lid 315. Lid 315 may be joined to brim 330 of container 314 during filling of container 314. Package 310 is opened by peeling closure 314 away from rim 317 to open the mouth and access interior product-storage region 32 as shown in FIG. 2.

Cold-durable, heat-resistant, peelable films 18, 118, 218, 318, 418, 518, 618, 718 described herein may be formed into packaging, such as, for example, rectangle-shaped package 10 illustrated in FIGS. 1-3, 13, and 15, rectangle-shaped package 100 illustrated in FIGS. 18 and 20, rectangle-shaped package 210 illustrated in FIGS. 23-25, and cylinder-shaped package 310 illustrated in FIGS. 28-30. Although packages 10, 100, 210 shown in FIGS. 1-3, 13, 15, 18, 20, and 23-26 including steam-venting systems, it should be understood that packages made from cold-durable, heat-resistant, peelable films of the present technology are not required to include a steam-venting system as shown in FIGS. 28-30. Conventional packaging equipment, such as, but not limited to, vertical form fill-and-seal equipment or horizontal form fill-and-seal equipment can be used to form the package.

The present disclosure also provides a lid for a container, the lid comprising: (a) a brim adapted to be fittable on or around a rim of the container; (b) a cold-durable, heat-resistant, peelable film associated with the brim and comprising (i) a sealant layer comprising: (A) an inner heat sealable sub-layer formed from at least one polypropylene/alpha-olefin copolymer, the polypropylene/alpha-olefin copolymer having a melt flow rate in a range of about 0.5 g/10 min. to about 45 g/10 min, and at least two different polyethylene polymer resins one of which has a melt index in a range of about 0.50 g/10 min. to about 20 g/10 min, (B) a core sub-layer adjacent to the heat sealable sub-layer, the core sub-layer being formed from a polymeric material having a melting point of at least 71° C., and (C) an outer skin sub-layer formed from at least one polyethylene polymer resin, the at least one polyethylene polymer resin having a melt index in a range of about 0.50 g/10 min. to about 20 g/10 min, and (ii) a protective layer laminated to the outer skin sub-layer, the protective layer being formed from a polymer material that is temperature resistant at a temperature of about 105° C., (c) an adhesive associated with the rim to facilitate attachment of the lid to a container. The sealant layer does not fracture when exposed to a temperature in a range of about −20° C. to about 0° C. The sealant layer may be peeled either before or after heating with a peel force in a range of about 1 lbf/in to about 5 lbf/in. The container permits the frozen food to be heated directly in a microwave oven or other source of heating energy at a temperature of up to about 105° C. without melting or bursting the container.

The present disclosure also provides a steam venting system, comprising: (a) a container; and (b) a cold-durable, heat-resistant, peelable film associated with the container and comprising (i) a sealant layer comprising: (A) an inner heat sealable sub-layer formed from at least one polypropylene/alpha-olefin copolymer, the polypropylene/alpha-olefin copolymer having a melt flow rate in a range of about 0.5 g/10 min. to about 45 g/10 min, and at least two different polyethylene polymer resins one of which has a melt index in a range of about 0.50 g/10 min. to about 20 g/10 min, (B) a core sub-layer adjacent to the heat sealable sub-layer, the core sub-layer being formed from a polymeric material having a melting point of at least 71° C., and (C) an outer skin sub-layer formed from at least one polyethylene polymer resin, the at least one polyethylene polymer resin having a melt index in a range of about 0.50 g/10 min. to about 20 g/10 min, and (ii) a protective layer laminated to the outer skin sub-layer, the protective layer being formed from a polymer material that is temperature resistant at a temperature of about 105° C. The sealant layer does not fracture when exposed to a temperature in a range of about −20° C. to about 0° C. The sealant layer may be peeled either before or after heating with a peel force in a range of about 1 lbf/in to about 5 lbf/in. The container permits the frozen food to be heated directly in a microwave or other oven at a temperature of up to about 105° C. without melting or bursting the container. The venting system may also include a plurality of venting apertures extending through the peelable film so as to create a plurality of open passageways through which steam can pass from within the container to the outside. The plurality of venting apertures may comprise a first set of slits extending and spaced across a portion of and proximate to a first edge of the peelable film and a second set of slits extending and spaced across a portion of and proximate to a second edge of the peelable film and generally parallel to the first set of slits, the second edge of the peelable being opposite the first edge. Each slit may comprise a slit passageway in each layer and sub-layer whereby the slit passageways are aligned to provide an open passageway through the peelable film such that steam generated when the container is subjected to heating energy is able to escape through at least a portion of the plurality of slits.

A method of heating an article in a container and venting steam created therefrom, comprising a) providing an article to be heated; b) providing a receptacle for holding the article, the receptacle comprising a container and cold-durable, heat-resistant, peelable film, comprising (i) a sealant layer; and (ii) a protective layer, wherein A) the sealant layer is a polypropylene-based monolayer polyolefin layer comprising at least one polyethylene polymer resin or a polypropylene-based multilayer polyolefin film comprising at least two different polyethylene polymer resins, B) the sealant layer does not fracture when exposed to a temperature in the a range of about −20° C. to about 0° C., C) the sealant layer does not melt or burst when exposed to a temperature of up to about 105° C. without melting, D) the sealant layer may be peeled either before or after heating with a peel force in a range of about 1 lbf/in to about 3 5 lbf/in, and E) the protective layer may be included as part of the sealant layer, (iii) a plurality of venting apertures extending through the peelable film so as to create a plurality of open passageways through which steam can pass from within the container to the outside; c) applying the peelable film to the container containing the article so as to form a seal; d) heating the article by applying energy to the article in the form of either heat or microwave energy such that seam created during heating is vented outside the container via the plurality of vent holes. The method may also include a step step e) of peeling the peelable film at least partially from the container so as to provide access to the article contained therein.

The presently described technology is further illustrated by the following examples, which are set forth for purposes of illustration only and are not to be construed as limiting the invention or scope of the specific compositions described herein. Parts and percentages are by weight unless stated otherwise.

Example I

Sealant Layer Formulations

Three-layer polyolefin sealant layer formulations were prepared as Comparative Example 1, Examples 1-3, and Examples 8-9 using a conventional blown film coextrusion process. Monolayer polyolefin sealant layer formulations were prepared as Examples 4-7 using a conventional monolayer film process. The structures of the sealant layer formulations are shown in Table 1.

TABLE 1

Sealant Layer Formulations

| # | Sealant Layer Name | Sub-layer Type | Approximate Sub-layer Percentage | Approximate Resin Composition in Percentage | Resin Supplier | Resin Trade Name | Resin Number | Resin Type |
|---|---|---|---|---|---|---|---|---|
| Sealant layer formulations for laminated structures in FIGS. 5-7 | Comparative Example 1 | Inner Heat Sealable Sub-layer (A) | 30% | 50% | DOW | Polypropylene | 6D20 | Polypropylene - Copolymer |
| | | | | 25% | DOW | Engage | 8150 | Polyolefin Elastomer |
| | | | | 21% | DOW | Versify | 3000 | Polyolefin Elastomer |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer(C) | 27% | 68% | DOW | Polypropylene | H110-02N | Polypropylene - Homopolymer |
| | | | | 30% | DOW | Engage | 8150 | Polyolefin Elastomer |
| | | | | 2% | Ingenia | Slip/AB Masterbatch | 1070 | Slip/AB Masterbatch |

TABLE 1-continued

Sealant Layer Formulations

| # | Sealant Layer Name | Sub-layer Type | Approximate Sub-layer Percentage | Approximate Resin Composition in Percentage | Resin Supplier | Resin Trade Name | Resin Number | Resin Type |
|---|---|---|---|---|---|---|---|---|
| | Example 1 | Inner Heat Sealable Sub-layer (A) | 30% | 47% | DOW | Polypropylene | 6D20 | Polypropylene - Copolymer |
| | | | | 20% | DOW | Engage | 8150 | Polyolefin Elastomer |
| | | | | 15% | DOW | Versify | 3000 | Polyolefin Elastomer |
| | | | | 14% | DOW | Elite | 5400G | Linear Low Density Polyethylene |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer(C) | 27% | 68% | DOW | Polypropylene | H110-02N | Polypropylene - Homopolymer |
| | | | | 30% | DOW | Engage | 8150 | Polyolefin Elastomer |
| | | | | 2% | Ingenia | Slip/AB Masterbatch | 1070 | Slip/AB Masterbatch |
| | Example 2 | Inner Heat Sealable Sub-layer(A) | 30% | 30% | DOW | Polypropylene | 6D20 | Polypropylene - Copolymer |
| | | | | 45% | DOW | Engage | 8150 | Polyolefin Elastomer |
| | | | | 21% | DOW | Versify | 3000 | Polyolefin Elastomer |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer (C) | 27% | 69% | DOW | Polypropylene | H110-02N | Polypropylene - Homopolymer |
| | | | | 30% | DOW | Engage | 8150 | Polyolefin Elastomer |
| | | | | 1% | Ingenia | Slip/AB Masterbatch | 1070 | Slip/AB Masterbatch |
| | Example 3 | Inner Heat Sealable Sub-layer (A) | 30% | 41% | DOW | Polypropylene | 6D20 | Polypropylene - Copolymer |
| | | | | 35% | DOW | Engage | 8150 | Polyolefin Elastomer |
| | | | | 20% | DOW | Elite | 5400G | Linear Low Density Polyethylene |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer (C) | 27% | 69% | DOW | Polypropylene | H110-02N | Polypropylene - Homopolymer |
| | | | | 30% | DOW | Engage | 8150 | Polyolefin Elastomer |
| | | | | 1% | Ingenia | Slip/AB Masterbatch | 1070 | Slip/AB Masterbatch |
| Sealant layer formulations for laminated structures in FIG. 10-12 | Example 4 | Monolayer Sealant | 100% | 50% | DOW | Polypropylene | 6D20 | Polypropylene - Copolymer |
| | | | | 22% | Total | Polypropylene | EOD02-15 | Isotactic Propylene Copolymer |
| | | | | 25% | Huntsman | Polyethylene | LD1058 | Low Density Polyethylene |
| | | | | 3% | Ingenia | Slip/AB Masterbatch | 1070 | Slip/AB Masterbatch |
| | Example 5 | Monolayer Sealant | 100% | 52% | DOW | Polypropylene | 6D20 | Polypropylene - Copolymer |
| | | | | 29% | Total | Polypropylene | EOD02-15 | Isotactic Propylene Copolymer |
| | | | | 16% | Huntsman | Polyethylene | LD1058 | Low Density Polyethylene |
| | | | | 3% | Ingenia | Slip/AB Masterbatch | 1070 | Slip/AB Masterbatch |

TABLE 1-continued

Sealant Layer Formulations

| # | Sealant Layer Name | Sub-layer Type | Approximate Sub-layer Percentage | Approximate Resin Composition in Percentage | Resin Supplier | Resin Trade Name | Resin Number | Resin Type |
|---|---|---|---|---|---|---|---|---|
| | Example 6 | Monolayer Sealant | 100% | 49% | DOW | Polypropylene | 6D20 | Polypropylene - Copolymer |
| | | | | 28% | Total | Polypropylene | EOD02-15 | Isotactic Propylene Copolymer |
| | | | | 19% | Huntsman | Polyethylene | LD1058 | Low Density Polyethylene |
| | | | | 1% | Polyfil | Antiblock | ABC2000 | Antiblock |
| | | | | 3% | Ingenia | Slip/AB Masterbatch | 1070 | Slip/AB Masterbatch |
| | Example 7 | Monolayer Sealant | 100% | 28% | DOW | Polypropylene | 6D20 | Polypropylene - Copolymer |
| | | | | 28% | Total | Polypropylene | EOD02-15 | Isotactic Propylene Copolymer |
| | | | | 20% | DOW | Polypropylene | H110-02N | Polypropylene - Homopolymer |
| | | | | 20% | Huntsman | Polyethylene | LD1058 | Low Density Polyethylene |
| | | | | 1% | Polyfil | Antiblock | ABC2000 | Antiblock |
| | | | | 3% | Ingenia | Slip/AB Masterbatch | 1070 | Slip/AB Masterbatch |
| Sealant layer formulations for non-laminated structures in FIGS. 8 and 9 | Example 8 | Inner Heat Sealable Sub-layer (A) | 30% | 30% | DOW | Polypropylene | 6D20 | Polypropylene - Copolymer |
| | | | | 45% | DOW | Engage | 8150 | Polyolefin Elastomer |
| | | | | 21% | DOW | Versify | 3000 | Polyolefin Elastomer |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer (C) | 27% | 99% | DOW | Polypropylene | H110-02N | Polypropylene - Homopolymer |
| | | | | 1% | Ingenia | Slip/AB Masterbatch | 1070 | Slip/AB Masterbatch |
| | Example 9 | Inner Heat Sealable Sub-layer (A) | 30% | 41% | DOW | Polypropylene | 6D20 | Polypropylene - Copolymer |
| | | | | 35% | DOW | Engage | 8150 | Polyolefin Elastomer |
| | | | | 20% | DOW | Elite | 5400G | Linear Low Density Polyethylene |
| | | | | 3% | Ingenia | Slip/AB Masterbatch | 1070 | Slip/AB Masterbatch |
| | | | | 1% | Ampacet | Slip Masterbatch | 100041 | Slip Masterbatch |
| | | Core Sub-layer (B) | 43% | 75% | DOW | Polypropylene | H110-02N | Polypropylene - Homopolymer |
| | | | | 25% | DOW | Engage | 8150 | Polyolefin Elastomer |
| | | Outer Skin Sub-layer (C) | 27% | 99% | DOW | Polypropylene | H110-02N | Polypropylene - Homopolymer |
| | | | | 1% | Ingenia | Slip/AB Masterbatch | 1070 | Slip/AB Masterbatch |

Example II

Peel Strength Test for the Sealant Layer of Comparative Example 1

A polyurethane adhesive available from Dow Chemical as Dow L75-164/C-411 was applied to the outer skin sub-layer of the three-layer coextruded sealant layer of Comparative Example 1 (described in Table 1) to bond a PET outer protective layer. The PET film is available from Terphane, Bloomfield, N.Y., under the trade name Terphane PET and also available from Toray Plastics, North Kingstown, R.I., under the trade name Lumirror®, and has a thickness of about 0.48 mil. The resulting 3.0-mil PET-laminated three-layer coextruded sealant layer was sealed to a polypropylene sheet used for a HealthyChoice Lunch Steamer Tray product. A SENTINEL heat-seal machine (available from Sencorp Inc., Hyannis, Mass., model 12-12ASL/1) was used to seal the layer to the polypropylene sheet. The heat sealing temperature was varied over the range from 290° C. to 400° C. The pressure of the heat seal jaws was 40 psi to create a seal depth of 0.5 inches. The dwell (seal) time was varied over a 1-second to 5-second range. Peel strength results, i.e., average peak load of sideways pulling force (lbf/in) as a function of seal temperature and seal time, are shown in Table 2.

TABLE 2

Peel Strength Test Results for the Sealant Layer of Comparative Example 1 in a 3.0-mil Laminate Sealed to a Polypropylene Sheet (see FIG. 5)

| Seal Temperature (° F.) | Average Peak Load at Various Seal Time (lbf/in) | | | | |
|---|---|---|---|---|---|
| | 1 s | 2 s | 3 s | 4 s | 5 s |
| 290 | —[a] | —[a] | —[a] | —[a] | —[a] |
| 300 | —[a] | —[a] | —[a] | 0.198[b] | 0.361[b] |
| 310 | —[a] | —[a] | 0.133[b] | 0.335[b] | 1.073[c] |
| 320 | —[a] | 0.132[b] | 0.249[b] | 0.520[b] | 1.691[c] |
| 330 | —[a] | 0.114[b] | 0.354[b] | 1.733[c] | 1.905[c] |
| 340 | —[a] | 0.158[b] | 0.794[b] | 1.760[c] | 2.407[c] |
| 350 | —[a] | 0.327[b] | 1.643[c] | 1.890[c] | 2.148[c] |
| 360 | 0.073[b] | 0.716[b] | 2.003[c] | 2.139[c] | 2.782[c] |
| 370 | 0.093[b] | 1.290[c] | 2.192[c] | 3.225[c] | 3.454[c] |
| 380 | 0.085[b] | 1.871[c] | 2.496[c] | 3.382[d] | 6.399[d] |
| 390 | 0.130[b] | 2.465[c] | 2.978[d] | 4.594[d] | 8.098[d] |
| 400 | 0.354[b] | 2.320[c] | 3.816[d] | 5.258[d] | 9.039[d] |
| Seal Window (° F.): | none | 370-400° F. | 350-380° F. | 330-370° F. | 310-370° F. |

[a]No seal or very weak seal (will not hold any steam pressure in cook cycle).
[b]Seals quite well (may fail in microwave test, peelable (usually 0.4 lbf/in ≤ Load ≤ 1 lbf/in)).
[c]Seals well (likely will maintain steam pressure and pass the microwave test, peelable (usually 1.0 lbf/in < Load ≤ 3.25 lbf/in)).
[d]Lock-seal (will delaminate/tear when peeled (usually Load > 3.25 lbf/in)).

Example III

Peel Strength Test for the Sealant Layer of Example 1

A polyurethane adhesive available from Dow Chemical as Dow L75-164/C-411 was applied to the outer skin sub-layer of the three-layer coextruded sealant layer of Example 1 (described in Table 1) to bond a PET outer protective layer. The PET film is available from Terphane, Bloomfield, N.Y., under the trade name Terphane PET and also available from Toray Plastics, North Kingstown, R.I., under the trade name Lumirror®, and has a thickness of about 0.48 mil. The resulting 2.5-mil PET-laminated three-layer coextruded sealant layer was sealed to a polypropylene sheet used for a HealthyChoice Lunch Steamer Tray product. A SENTINEL heat-seal machine (available from Sencorp Inc., Hyannis, Mass., model 12-12ASL/1) was used to seal the layer to the polypropylene sheet. The heat sealing temperature was varied over the range from 290° C. to 400° C. The pressure of the heat seal jaws was 40 psi to create a seal depth of 0.5 inches. The dwell (seal) time was varied over a 1-second to 5-second range. Peel strength results, i.e., average peak load of sideways pulling force (lbf/in) as a function of seal temperature and seal time, are shown in Table 3. Thirty (30) samples of the three-layer coextruded sealant layer of Example 1 (described in Table 1) bonded to a PET outer protective layer and sealed to a polypropylene sheet were all found to be intact after a year at freezing temperature thereby demonstrating long-term freezer stability.

TABLE 3

Peel Strength Test Results for the Sealant Layer of Example 1 in a 2.5-mil Laminate Sealed to Polypropylene Sheet (see FIG. 5)

| Seal Temperature (° F.) | Average Peak Load at Various Seal Time (lbf/in) | | | | |
|---|---|---|---|---|---|
| | 1 s | 2 s | 3 s | 4 s | 5 s |
| 290 | 0[a] | 0[a] | 0[a] | 0[a] | 0[a] |
| 300 | 0[a] | 0[a] | 0[a] | 0[a] | 0[a] |
| 310 | 0[a] | 0[a] | 0[a] | 0[a] | 0.230[a] |
| 320 | 0.109[a] | 0.133[a] | 0.292[a] | 0.401[b] | 0.821[b] |
| 330 | 0.117[a] | 0.183[a] | 0.311[a] | 0.493[b] | 1.378[c] |
| 340 | 0.142[a] | 0.329[a] | 0.423[b] | 1.330[c] | 2.016[c] |
| 350 | 0.149[a] | 0.679[b] | 2.060[c] | 2.553[c] | 2.438[c] |
| 360 | 0.257[a] | 1.856[c] | 2.296[c] | 3.269[c] | 3.225[c] |
| 370 | 0.303[a] | 1.107[c] | 2.126[c] | 3.159[c] | 3.881[d] |
| 380 | 0.733[b] | 1.461[c] | 3.113[c] | 3.356[c] | 5.938[d] |
| 390 | 1.624[c] | 1.778[c] | 3.598[d] | 5.168[d] | 8.167[d] |
| 400 | 1.900[c] | 1.698[c] | 4.323[d] | 11.118[d] | 12.115[d] |
| Seal Window (° F.): | 380-400° F. | 360-400° F. | 350-380° F. | 340-380° F. | 320-360° F. |

[a]No seal or very weak seal (will not hold any steam pressure in cook cycle).
[b]Seals quite well (may fail in microwave test, peelable (usually 0.4 lbf/in ≤ Load ≤ 1 lbf/in)).
[c]Seals well (likely will maintain steam pressure and pass the microwave test, peelable (usually 1.0 lbf/in < Load ≤ 3.25 lbf/in)).
[d]Lock-seal (will delaminate/tear when peeled (usually Load > 3.25 lbf/in)).

Example IV

Peel Strength Test for the Sealant Layers of Examples 4-7

The 2.75-mil monolayer sealant layers from Examples 4-7 (described in Table 1) were sealed to a polypropylene sheet used for a HealthyChoice Lunch Steamer Tray product. A SENTINEL heat-seal machine (available from Sencorp Inc., Hyannis, Mass., model 12-12ASL/1) was used to seal the monolayers to the polypropylene sheet. The heat sealing temperature was varied over the range from 290° C. to 400° C. The pressure of the heat seal jaws was 40 psi to create a seal depth of 0.5 inches. The dwell (seal) time was 5 seconds. Peel strength results, i.e., average peak loads of sideways pulling force (lbf/in) at 5-second seal time as a function of seal temperature, are shown in Table 4.

TABLE 4

Peel Strength Test Results for the Sealant Layer of Examples 4-7 in a 2.75-mil Monolayer Sealed to a Polypropylene Sheet

| Seal Temperature (° F.) | Average Peak Load at 5 s Seal Time (lbf/in) | | | |
|---|---|---|---|---|
| | Example 4 | Example 5 | Example 6 | Example 7 |
| 290 | 0[a] | 0[a] | 0[a] | 0[a] |
| 300 | 0[a] | 0[a] | 0[a] | 0[a] |
| 310 | 0[a] | 0[a] | 0[a] | 0[a] |
| 320 | 0.090[b] | 0.068[b] | 0.071[b] | 0.373[b] |
| 330 | 0.538[c] | 0.206[c] | 0.509[c] | 1.138[c] |
| 340 | 1.528[c] | 1.574[c] | 1.525[c] | 2.249[c] |
| 350 | 2.608[c] | 1.774[c] | 2.240[c] | 3.224[c] |
| 360 | 3.349[c] | 3.120[c] | 2.905[c] | 3.033[c] |
| 370 | 2.707[c] | 3.483[c] | 3.496[c] | 3.193[c] |
| 380 | 3.267[c] | 3.643[c] | 3.763[c] | 3.195[c] |
| 390 | 2.854[d] | 3.333[d] | 3.704[d] | 3.209[d] |
| 400 | 2.630[d] | 3.245[d] | 3.507[d] | 3.360[d] |
| Seal Window (° F.): | 330-380° F. | 330-380° F. | 330-380° F. | 330-380° F. |

[a]No seal or very weak seal (will not hold any steam pressure in cook cycle).
[b]Seals quite well (may fail in microwave test, peelable (usually 0.4 lbf/in ≤ Load ≤ 1 lbf/in)).
[c]Seals well (likely will maintain steam pressure and pass the microwave test, peelable (usually 1.0 lbf/in < Load ≤ 3.25 lbf/in)).
[d]Lock-seal (will delaminate/tear when peeled (usually Load > 3.25 lbf/in)).

Example V

Microwave Test for the Sealant Layer of Comparative Example 1

A polyurethane adhesive available from Dow Chemical as Dow L75-164/C-411 was applied to the outer skin sub-layer of the three-layer coextruded sealant layer of Comparative Example 1 (described in Table 1) to bond a PET outer protective layer. The PET film is available from Terphane, Bloomfield, N.Y., under the trade name Terphane PET and also available from Toray Plastics, North Kingstown, R.I., under the trade name Lumirror®, and has a thickness of about 0.48 mil. The resulting 3.0-mil PET-laminated three-layer coextruded sealant layer equipped with an opened steam-venting system of FIGS. 18-20 was used to seal a Healthy Choice Lunch Steamer Tray typically used for filling with 8-ounce frozen mixed vegetables. A Sure-pak HPS-1409 Manual Tray Sealer (available from HPE, Inc., Sioux Falls, S. Dak.) was used to seal the open-vented laminate film to the polypropylene tray. The heat sealing temperature was varied over the range from 300° C. to 350° C. The dwell (seal) time was varied over a 1-second to 30-second range. The sealed polypropylene tray was heated for 5 minutes in a 1200-watt FISO Microwave Oven. Results, i.e., peel strength (qualitative), maximum steam pressure (psi) before upwards pulling force caused seal failure or vent opening, and steady steam pressure (psi) in the cook cycle as a function of seal temperature and seal time, are shown in Table 5.

TABLE 5

Microwave Test Results for the Sealant Layer of Comparative Example 1 in a 3.0-mil Open-vented Laminate Sealed to a Polypropylene Tray

| Seal Temperature (° F.) | Heat Seal Time (second) | | | | | | | | | | |
|---|---|---|---|---|---|---|---|---|---|---|---|
| | 1 s | 2 s | 3 s | 4 s | 5 s | 7 s | 10 s | 13 s | 15 s | 20 s | 30 s |
| 300 | | | | | | | | | | 0.52 [1,a] 0.18 [2,a] | |
| 310 | | | | | | | 0.69 [1,a] 0.18 [2,a] | | | 0.87 [1,b] 0.21 [2,b] | 0.88 [1,b] 0.30 [2,b] |
| 320 | | | | | 0.82 [1,a] 0.19 [2,a] | | 0.81 [1,b] 0.38 [2,b] | 0.98 [1,b] 0.40 [2,b] | 1.13 [1,b] 0.8 [2,b] | 1.07 [1,c] 0.60 [2,c] | |
| 330 | | | 0.69 [1,b] 0.19 [2,b] | | 1.05 [1,b] 0.25 [2,b] | 1.22 [1,b] 0.40 [2,b] | | | | | |
| 335 | 0.17 [1,a] 0.02 [2,a] | | 0.73 [1,b] 0.20 [2,b] | | 1.32 [1,b] 0.38 [2,b] | 1.27 [1,c] 0.10 [2,c] | | | | | |
| 340 | 0.39 [1,a] 0.02 [2,a] | | 0.90 [1,b] 0.40 [2,b] | | 1.30 [1,c] 1.20 [2,c] | | | | | | |
| 345 | 0.52 [1,b] 0.18 [2,b] | | 0.95 [1,b] 0.20 [2,b] | 1.24 [1,c] 0 [2,c] | | | | | | | |
| 350 | 0.68 [1,b] 0.10 [2,b] | 1.21 [1,c] 0.18 [2,c] | | | | | | | | | |

[a] Easy peelable and weak seal, seal failure in microwave, not able to maintain steam pressure.
[b] Peelable and good seal, vent open, seal may have a small opening but still maintains good steam pressure (>0.15 psi) in cook cycle.
[c] Lock-seal, not peelable, maintains good steam pressure in cook cycle.
[1] Maximum steam pressure (psi) before seal failure or vent open.
[2] Steady steam pressure (psi) in cook cycle.

The invention claimed is:

1. A cold-durable, heat-resistant, peelable film for packaging a food product, comprising
   (a) a sealant layer and
   (b) a protective layer, wherein
      i) the sealant layer is a polypropylene-based monolayer polyolefin layer comprising polypropylene blended with at least one polyethylene polymer resin selected from the group consisting of an ethylene/octene copolymer, linear low density polyethylene, low density polyethylene, high density polyethylene, ethylene vinyl acetate, and ethylene methyl acrylate, or a polypropylene-based multilayer polyolefin film comprising an inner heat sealable sub-layer comprising polypropylene blended with at least two different polyethylene polymer resins each selected from the group consisting of an ethylene/octene copolymer, linear low density polyethylene, low density polyethylene, high density polyethylene, ethylene vinyl acetate, and ethylene methyl acrylate,
      ii) the sealant layer does not fracture when exposed to a temperature in a range of about −20° C. to about 0° C.,
      iii) the sealant layer does not melt or burst when exposed to a temperature of up to about 105° C.,
      iv) the sealant layer is adapted to be peeled from a polypropylene substrate either before or after heating with a peel force in a range of about 1 lbf/in to about 5 lbf/in,
      v) the protective layer is included as part of the sealant layer when the sealant layer is the polypropylene-based multilayer polyolefin film, and
   wherein the sealant layer is adapted to form a closure with the polypropylene substrate and to peel away easily so that the closure remains in one piece upon separation from the polypropylene substrate and wherein the inner heat sealable sub-layer is in contact with the polypropylene substrate when the sealant layer is the polypropylene-based multilayer film.

2. The cold-durable, heat-resistant, peelable film of claim 1, wherein the sealant layer is a polypropylene-based multilayer polyolefin layer comprising
   (a) the inner heat sealable sub-layer, wherein the inner heat sealable sub-layer is formed from at least one polypropylene/alpha-olefin copolymer, the polypropylene/alpha-olefin copolymer having a melt flow rate in a range of about 0.5 g/10 min. to about 45 g/10 min, and at least two different polyethylene polymer resins one of which has a melt index in a range of about 0.50 g/10 min. to about 20 g/10 min,
   (b) a core sub-layer adjacent to the inner heat sealable sub-layer, the core sub-layer being formed from a polymeric material having a melting point of at least 71° C., and (c) an outer skin sub-layer formed from at least one polyethylene polymer resin, the at least one polyethylene polymer resin having a melt index in a range of about 0.50 g/10 min. to about 20 g/10 min, wherein the protective layer is laminated to the outer skin sub-layer, the protective layer being formed from a polymer material that is temperature resistant at a temperature of up to about 105° C.

3. The cold-durable, heat-resistant, peelable film of claim 2, wherein the polypropylene/alpha-olefin copolymer comprises a propylene/ethylene copolymer containing ethylene comonomer in an amount in a range of about 1% to about 8% by weight of the copolymer.

4. The cold-durable, heat-resistant, peelable film of claim 2, wherein the inner heat sealable sub-layer comprises a blend of polypropylene/alpha-olefin copolymers.

5. The cold-durable, heat-resistant, peelable film of claim 4, wherein the blend of polypropylene/alpha-olefin copolymers comprises a propylene/ethylene copolymer containing ethylene comonomer in an amount in a range of about 1% to about 8% by weight.

6. The cold-durable, heat-resistant, peelable film of claim 2, wherein the polypropylene/alpha-olefin copolymer has a melting temperature greater than 71° C.

7. The cold-durable, heat-resistant, peelable film of claim 2, wherein the core sub-layer comprises a homopolymer polypropylene and a polyethylene polymer resin.

8. The cold-durable, heat-resistant, peelable film of claim 7, wherein the homopolymer polypropylene has a melt flow rate in a range of about 0.5 g/10 min. to about 25 g/10 min.

9. The cold-durable, heat-resistant, peelable film of claim 7, wherein the polyethylene polymer resin has a melt index in a range of about 0.50 g/10 min. to about 20 g/10 min.

10. The cold-durable, heat-resistant, peelable film of claim 2, wherein the outer skin sub-layer includes a homopolymer polypropylene having a melt flow rate in a range of about 0.5 g/10 min. to about 25 g/10 min.

11. The cold-durable, heat-resistant, peelable film of claim 2, wherein the protective layer is formed from a material selected from the group consisting of a polyethylene terephthalate film, a nylon film, a biaxially oriented polypropylene film, and a biaxially oriented propylene/ethylene copolymer film.

12. The cold-durable, heat-resistant, peelable film of claim 2, wherein an adhesive layer is used to laminate the protective layer to the outer skin sub-layer.

13. The cold-durable, heat-resistant, peelable film of claim 12, wherein the adhesive layer comprises a polyurethane adhesive.

14. The cold-durable, heat-resistant, peelable film of claim 12, wherein the adhesive layer is formed from a material selected from the group consisting of a polyurethane adhesive, polyester-polyurethane adhesive, a hot-melt of ethylene vinyl acetate, a hot-melt of polyamide, and a hot-melt of polyester.

15. The cold-durable, heat-resistant, peelable film of claim 2, wherein the multilayer polyolefin layer is either a coextruded blown film, a coextruded cast film, or a laminated film.

16. The cold-durable, heat-resistant, peelable film of claim 1, wherein the sealant layer is a polypropylene-based multilayer polyolefin layer comprising (a) the inner heat sealable sub-layer, wherein the inner heat sealable layer is formed from at least one polypropylene/alpha-olefin copolymer, the polypropylene/alpha-olefin copolymer having a melt flow rate in a range of about 0.5 g/10 min. to about 45 g/10 min, and at least two different polyethylene polymer resins one of which has a melt index in a range of about 0.50 g/10 min. to about 20 g/10 min, (b) a core sub-layer adjacent to the heat sealable sub-layer, the core sub-layer being formed from a polymeric material having a melting point of at least 71° C., and (c) an outer skin sub-layer formed from a homopolymer polypropylene resin, the homopolymer polypropylene resin having a melt flow rate in a range of about 0.50 g/10 min. to about 25 g/10 min, wherein the protective layer is the outer skin sub-layer.

17. The cold-durable, heat-resistant, peelable film of claim 16, wherein the inner heat sealable sub-layer comprises a blend of polypropylene/alpha-olefin copolymers.

18. The cold-durable, heat-resistant, peelable film of claim 17, wherein the blend of polypropylene/alpha-olefin copolymers comprises a propylene/ethylene copolymer containing ethylene comonomer in an amount in a range of about 1% to about 8% by weight.

19. The cold-durable, heat-resistant, peelable film of claim 16, wherein the polypropylene/alpha-olefin copolymer has a melting temperature greater than 71° C.

20. The cold-durable, heat-resistant, peelable film of claim 16, wherein the core sub-layer comprises at least one homopolymer polypropylene and at least one polyethylene polymer resin.

21. The cold-durable, heat-resistant, peelable film of claim 16, wherein the polypropylene-based multilayer polyolefin film is either a coextruded blown film, a coextruded cast film, or a laminated film.

22. The cold-durable, heat-resistant, peelable film of claim 1, further comprising a venting system.

23. The cold-durable, heat-resistant, peelable film of claim 1, wherein the sealant layer may be peeled from the polypropylene substrate either before or after heating with a peel force in a range of about 1 lbf/in to about 3 lbf/in.

24. A cold-durable, heat-resistant, peelable film for packaging a food product, comprising (a) a sealant layer and (b) a protective layer, wherein i) the sealant layer is a polypropylene-based monolayer polyolefin layer comprising polypropylene blended with at least one polyethylene polymer resin, or a polypropylene-based multilayer polyolefin film comprising polypropylene blended with at least two different polyethylene polymer resins, ii) the sealant layer does not fracture when exposed to a temperature in a range of about −20° C. to about 0° C., iii) the sealant layer does not melt or burst when exposed to a temperature of up to about 105° C., iv) the sealant layer is adapted to be peeled from a polypropylene substrate either before or after heating with a peel force in a range of about 1 lbf/in to about 5 lbf/in, v) the protective layer is included as part of the sealant layer when the sealant layer is the polypropylene-based multilayer polyolefin film, and wherein the sealant layer is adapted to form a closure with the polypropylene substrate and to peel away easily so that the closure remains in one piece upon separation from the polypropylene substrate.

* * * * *